April 23, 1957 W. DE BACK ET AL 2,789,795
APPARATUS FOR TREATING CANNED GOODS
Filed Jan. 13, 1953 10 Sheets-Sheet 4
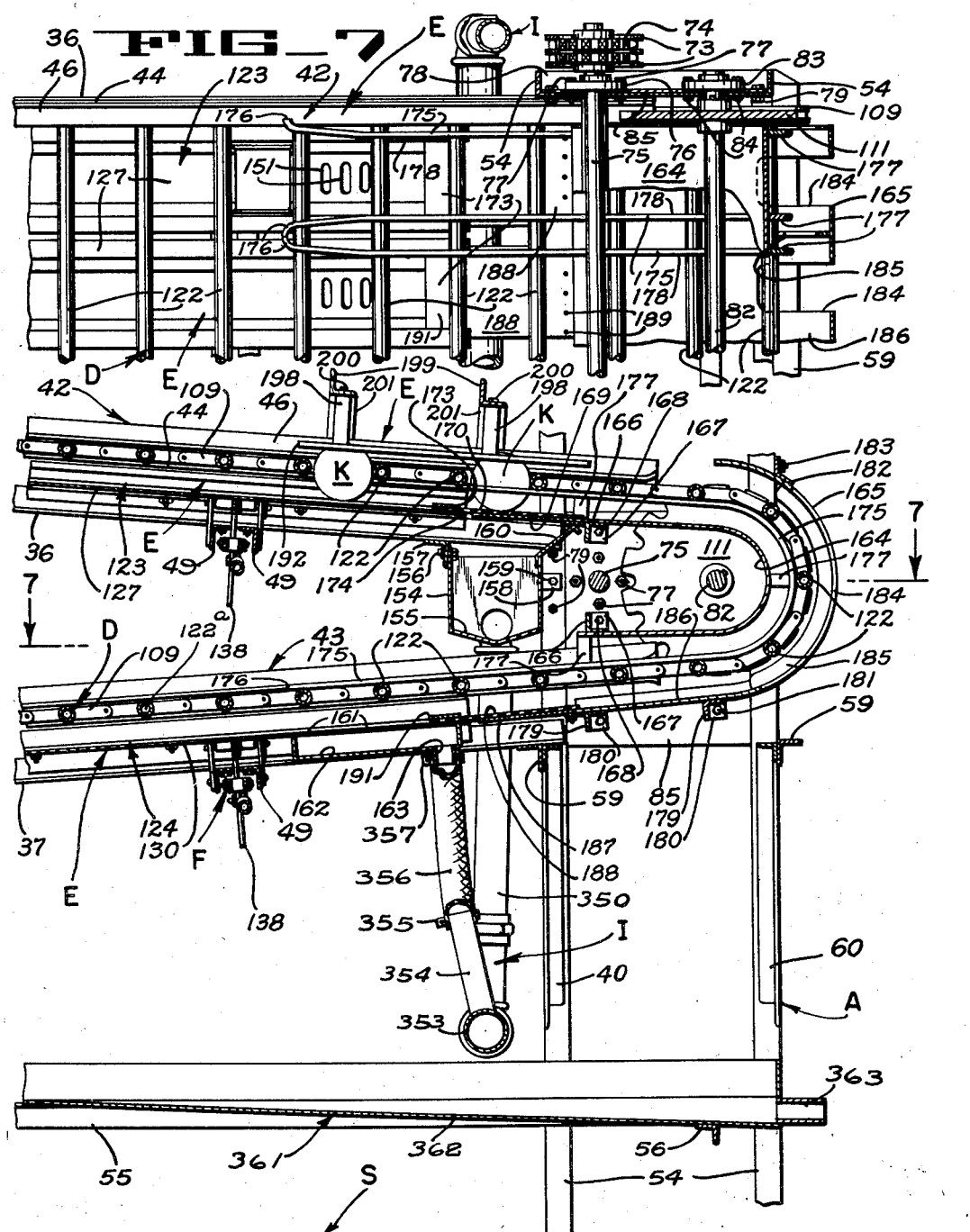
INVENTORS
WILLIAM DE BACK
SAMUEL A. MENCACCI
BY Hans G. Hoffmeister
ATTORNEY.

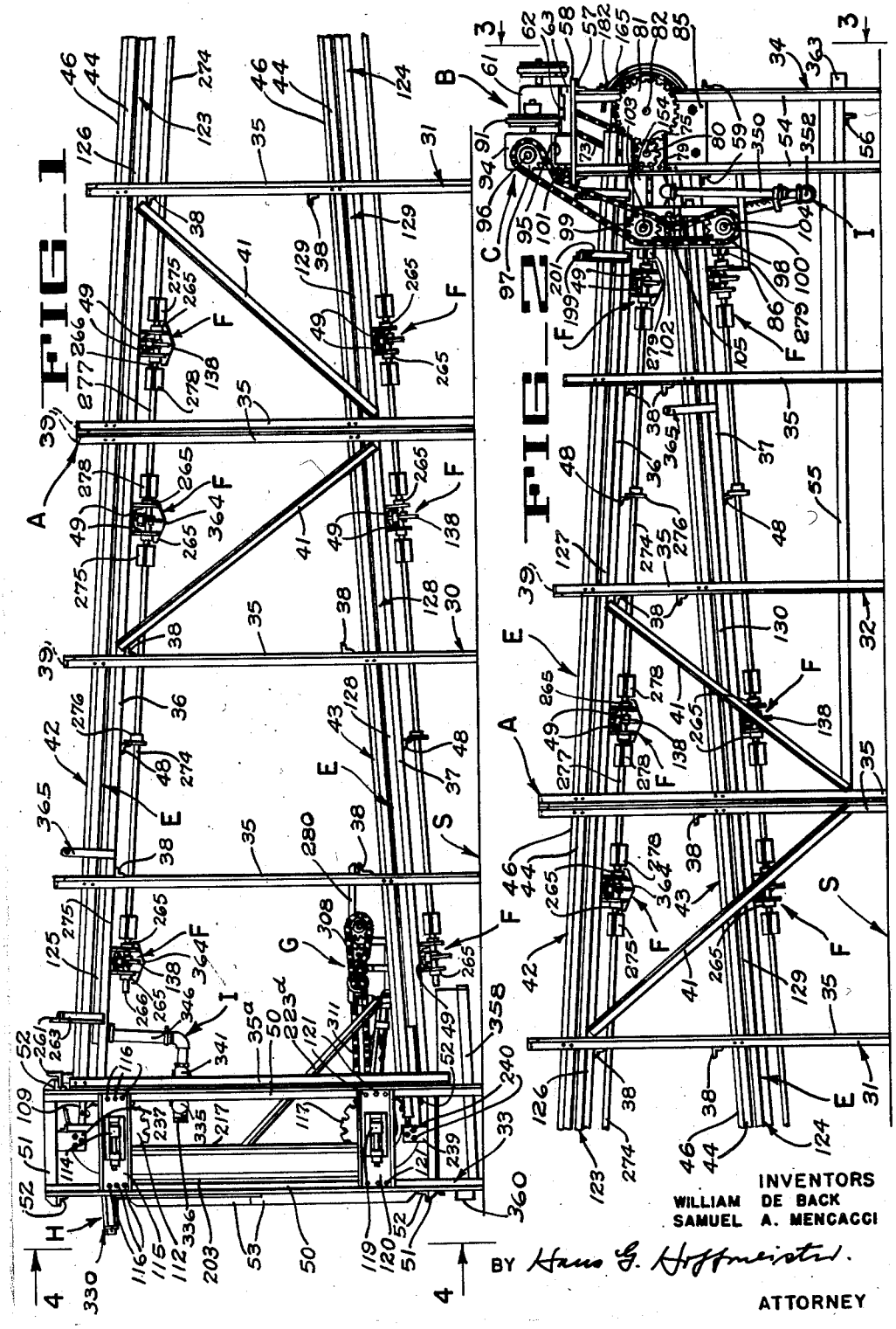

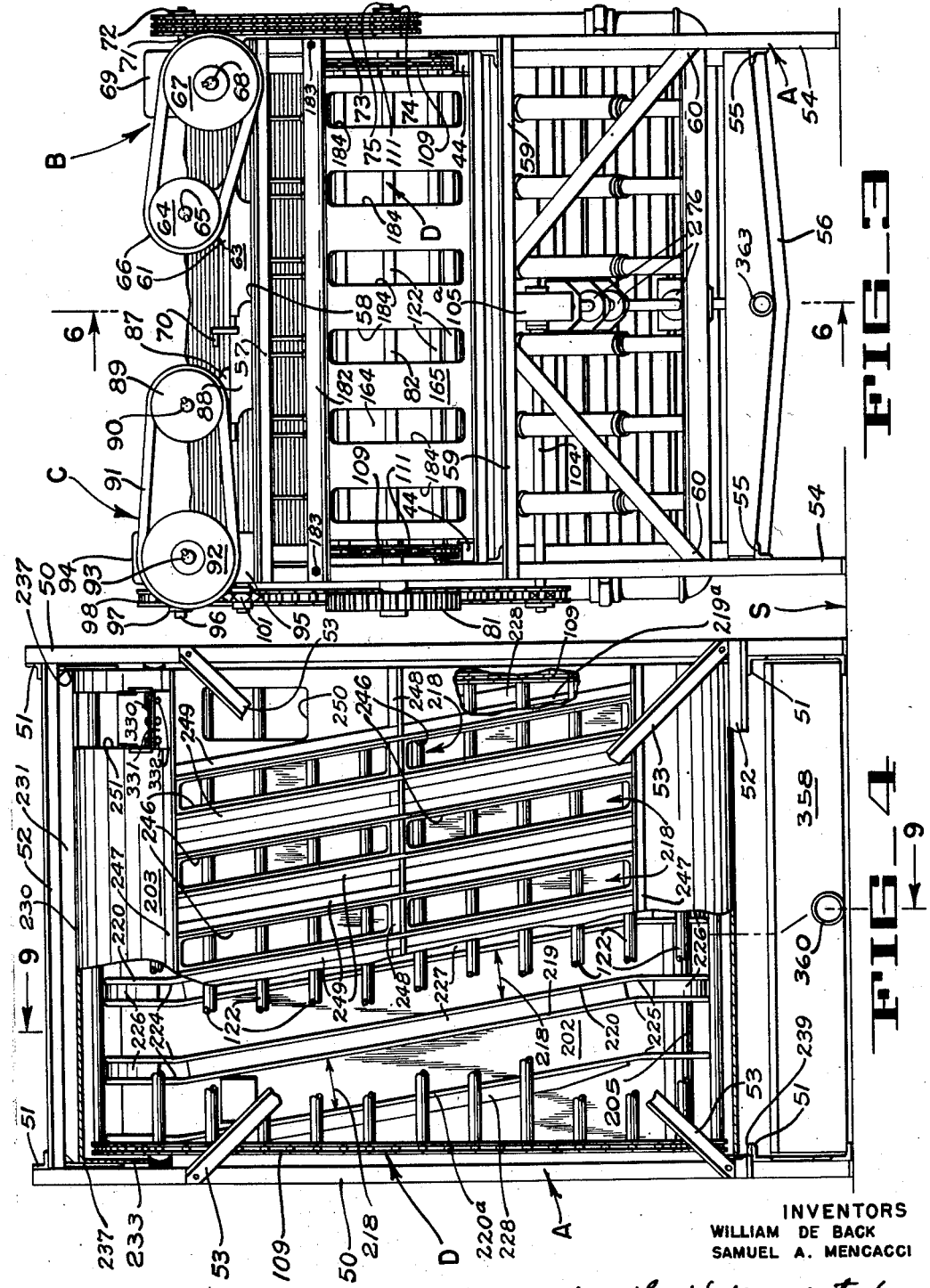

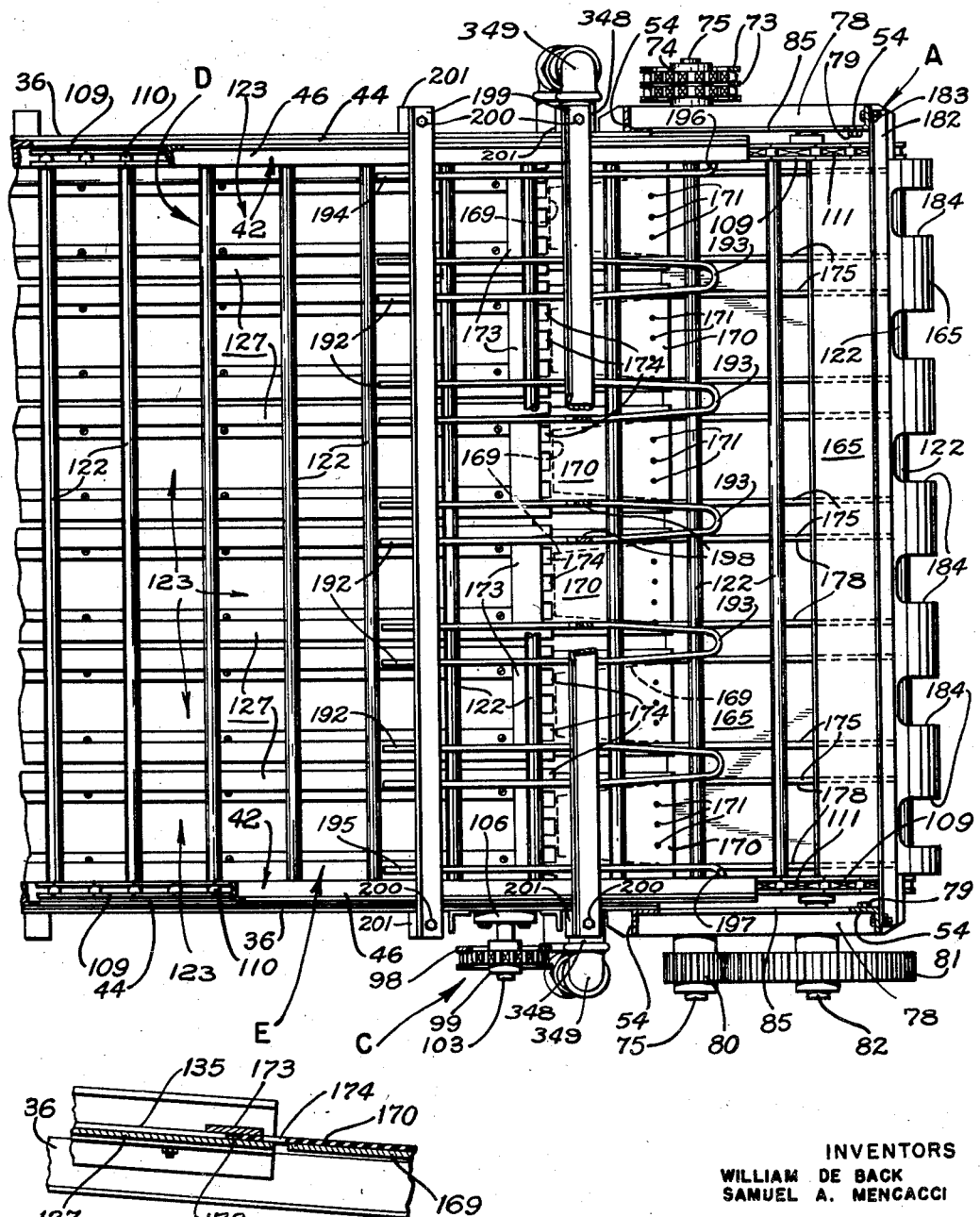

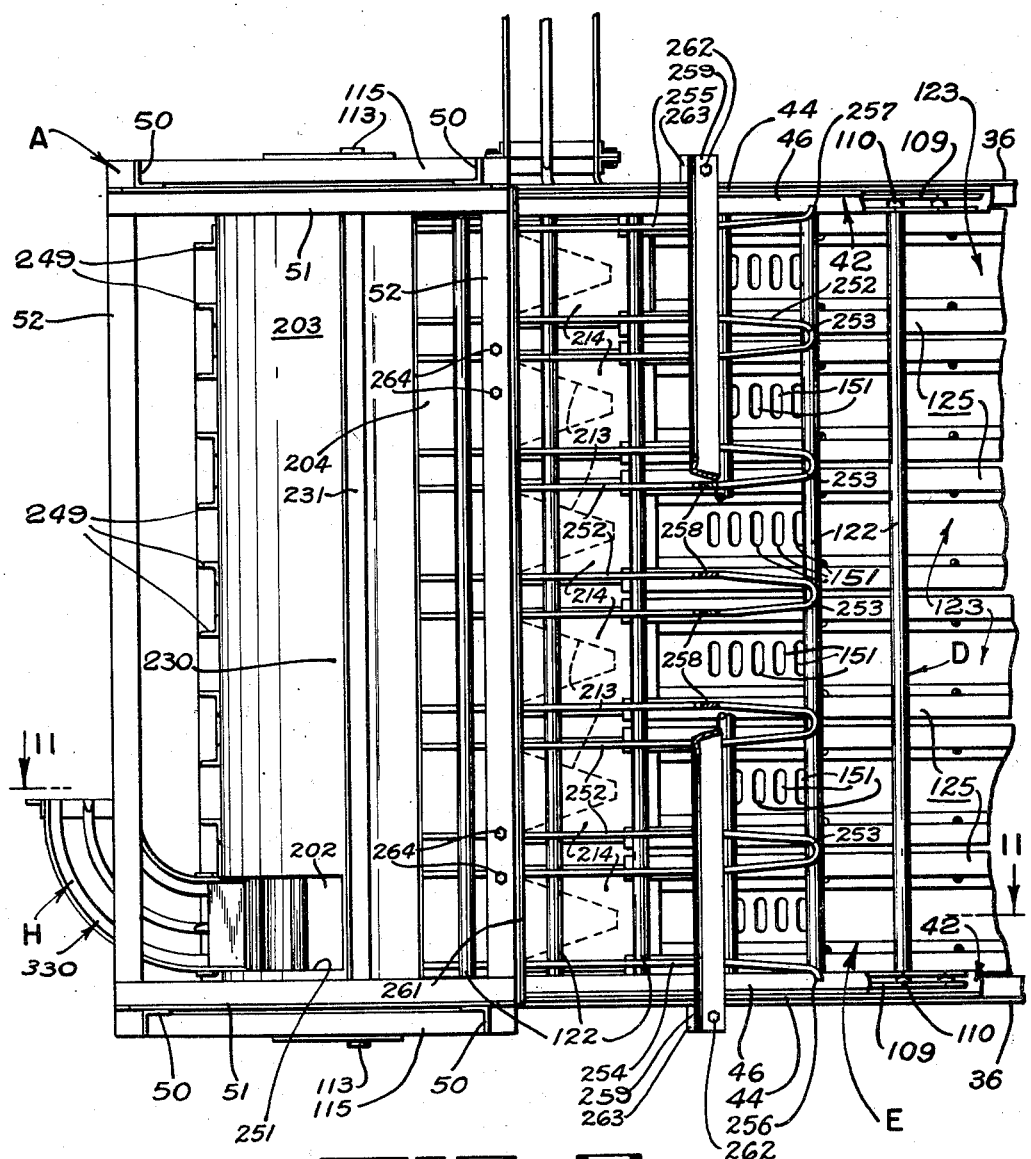
FIG_8

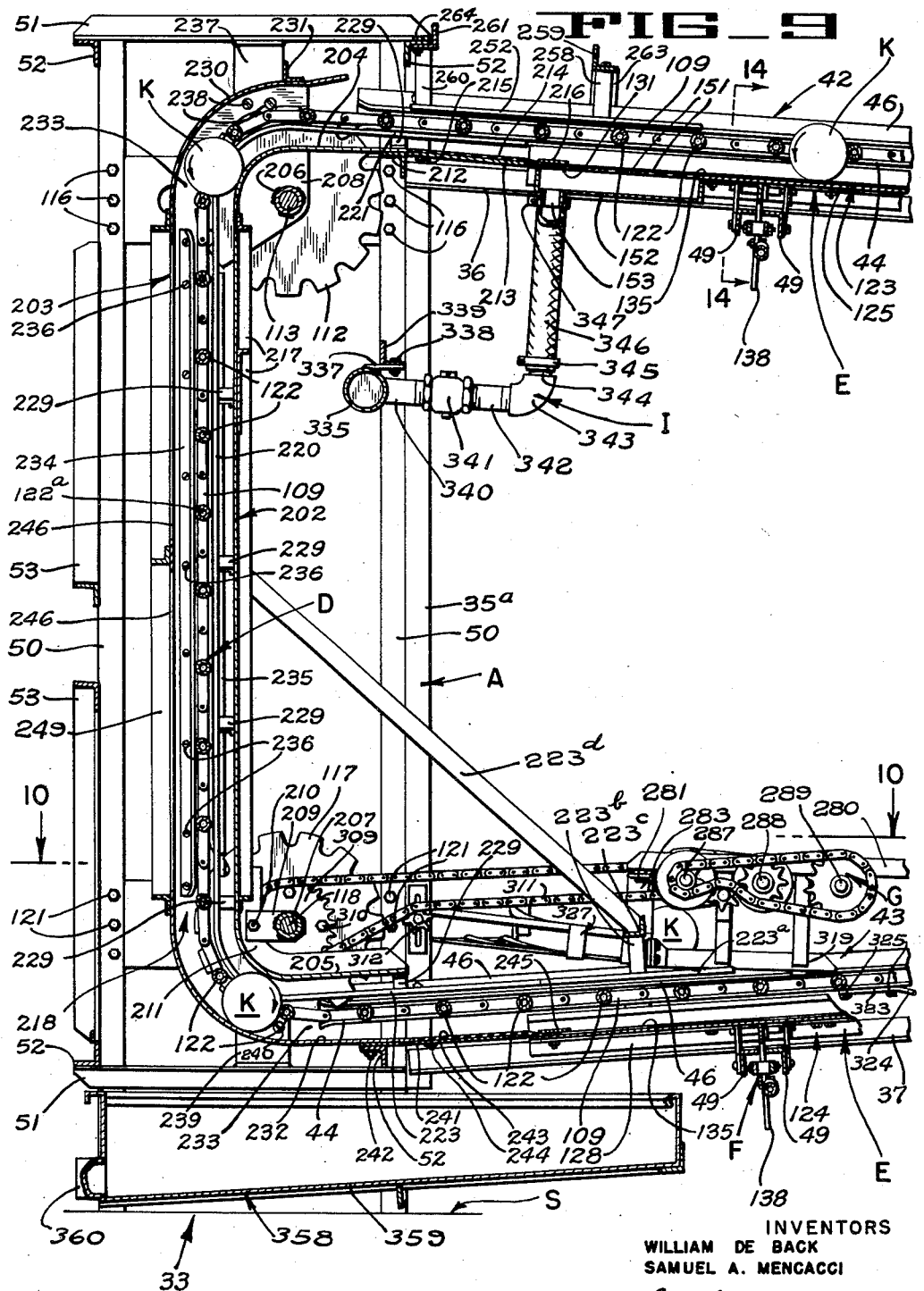

April 23, 1957 W. DE BACK ET AL 2,789,795
APPARATUS FOR TREATING CANNED GOODS
Filed Jan. 13, 1953 10 Sheets-Sheet 7
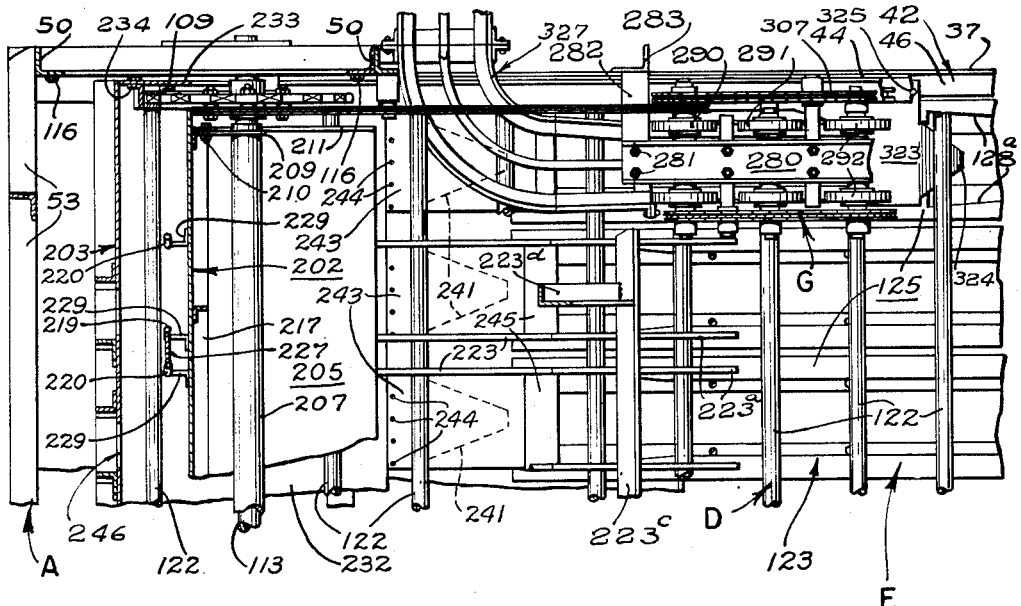
FIG_10
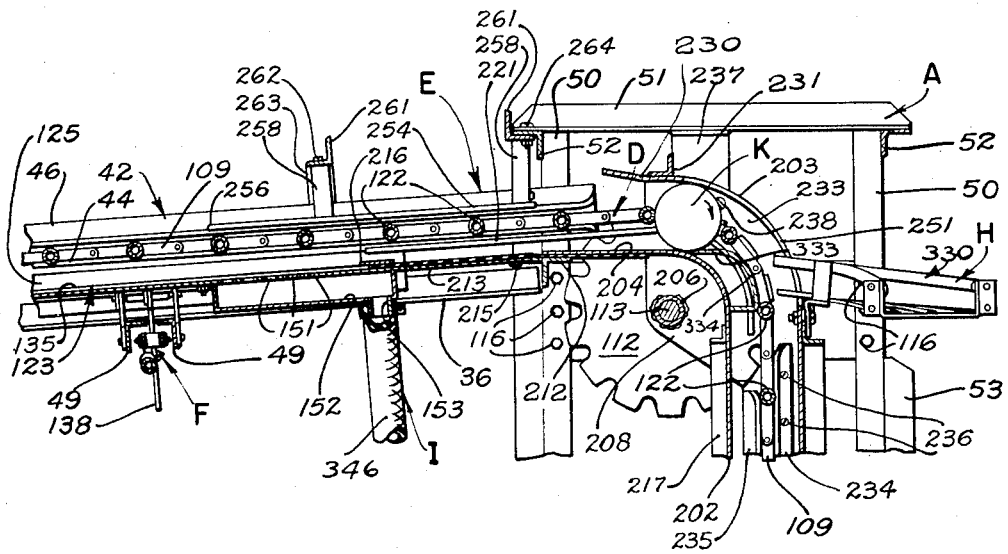
FIG_11
INVENTORS
WILLIAM DE BACK
SAMUEL A. MENCACCI
BY Hans G. Hoffmeister.
ATTORNEY

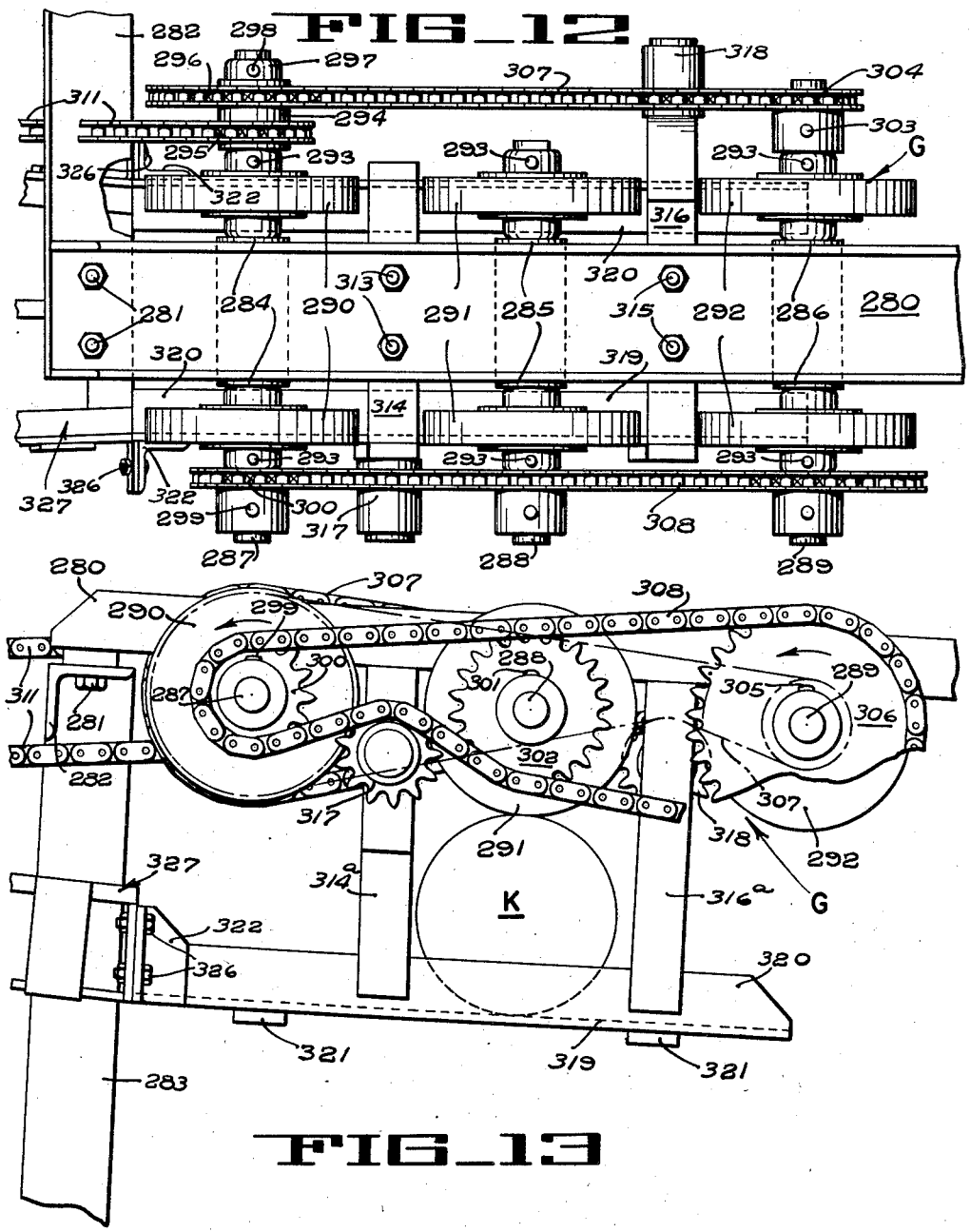

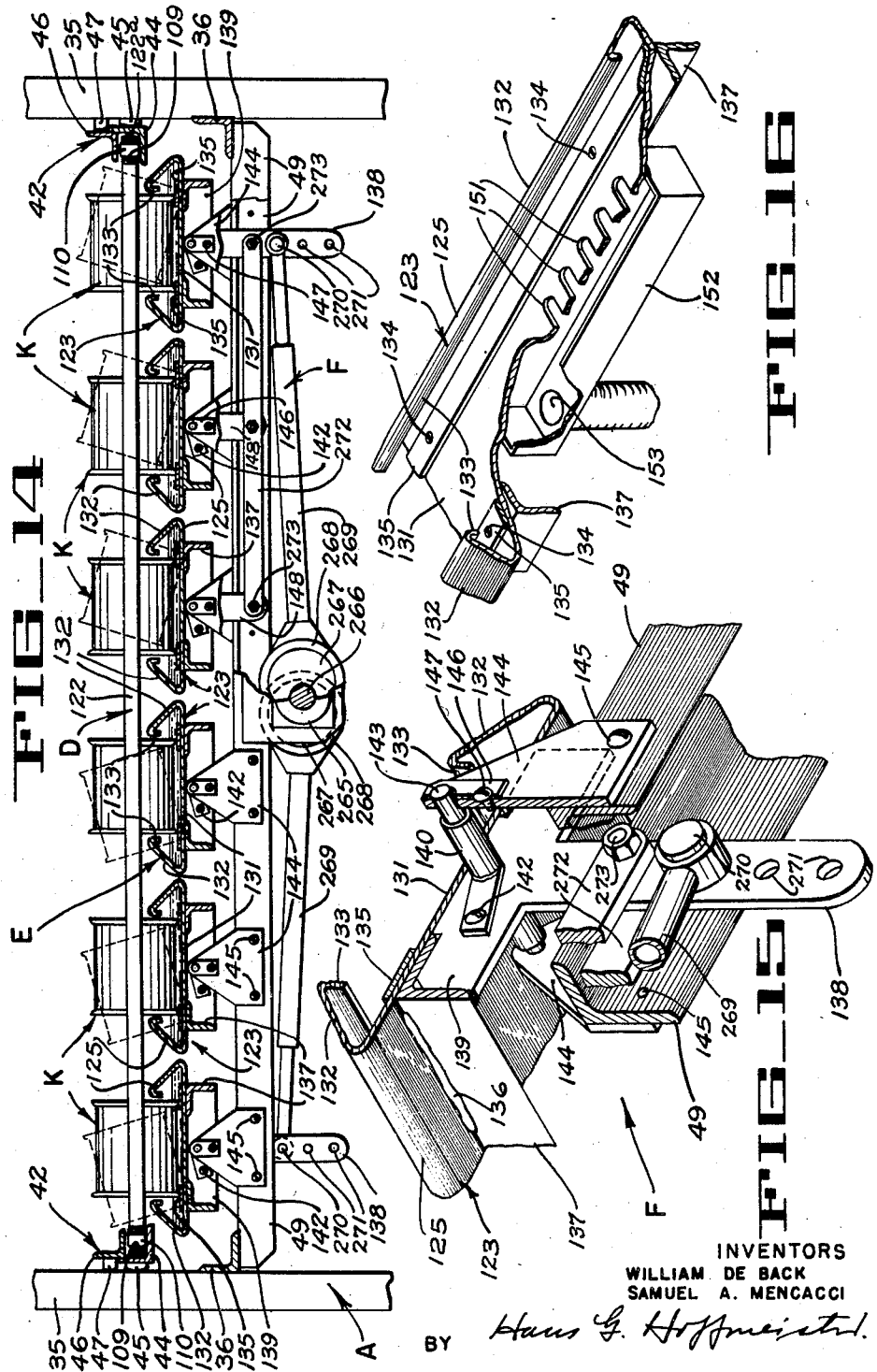

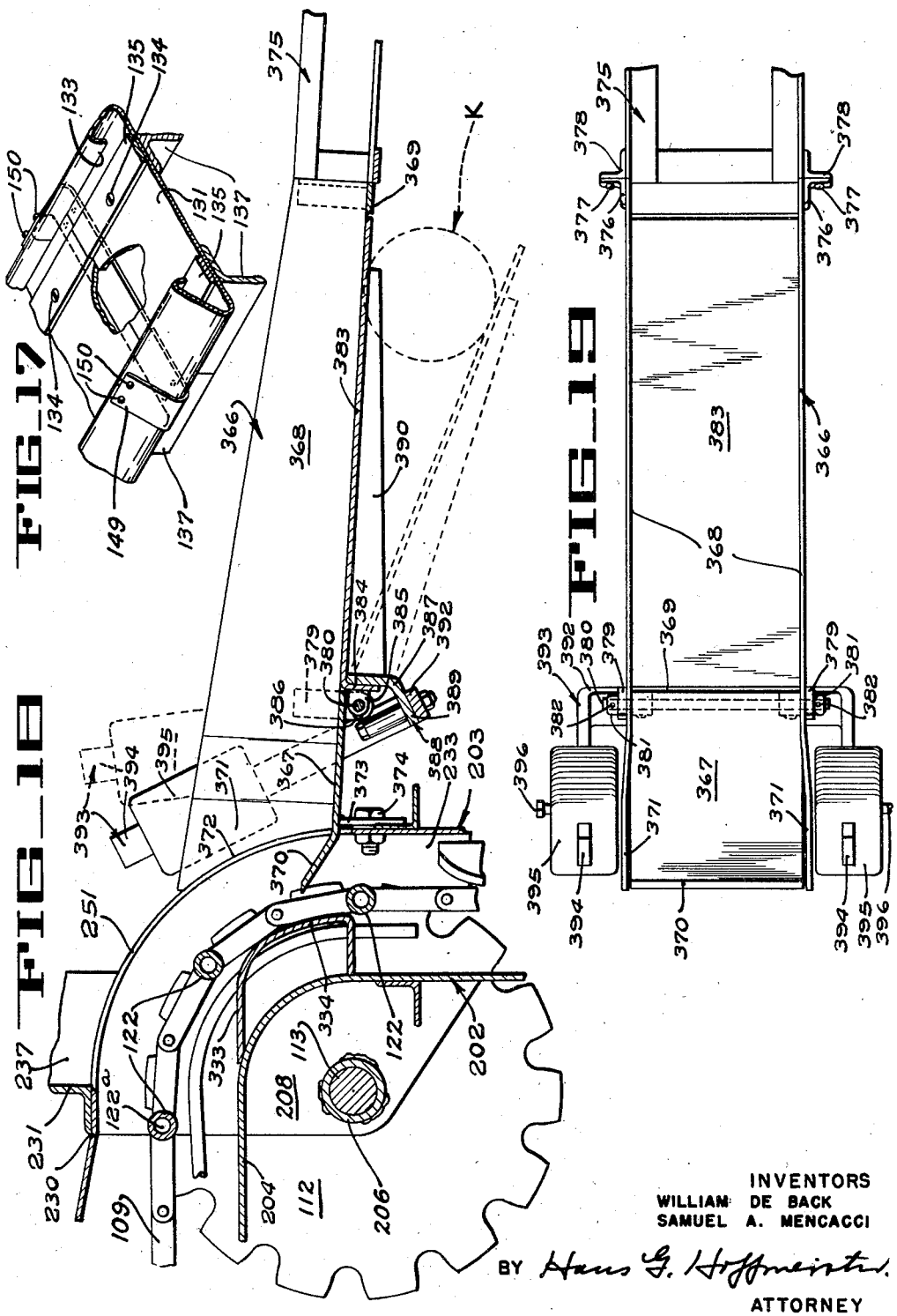

United States Patent Office 2,789,795
Patented Apr. 23, 1957

2,789,795

APPARATUS FOR TREATING CANNED GOODS

William de Back, St. Nicolas-Waes, Belgium, and Samuel A. Mencacci, San Jose, Calif., assignors to Food Machinery and Chemical Corporation, San Jose, Calif., a corporation of Delaware Application January 13, 1953, Serial No. 331,078

14 Claims. (Cl. 257—23)

This invention relates to a method of and an apparatus for treating canned goods and is directed more particularly to a method of and an apparatus for changing the temperature of newly-packed containers of produce.

The present invention is still more specifically concerned in the provision of a method of and an apparatus for cooling canned goods after the same have been subjected to heat treatment in processing units, such as cooking retorts, sterilization apparatus, or the like.

Therefore, one object of the invention is the provision of a novel and improved method for efficiently and effectively cooling the contents of hot, sealed, product filled containers, in the carrying out of which method the end and side surfaces of such containers are progressively and successively subjected to the action of a cooling medium and concurrently therewith the entire contents of the containers are progressively and successively agitated into contact with the cooled end and side walls of said containers.

Another object is to provide an apparatus especially and particularly adapted for effecting the gradual cooling of hot canned goods by and with a relatively small quantity of cooling liquid.

A still further object is to develop or produce in a can cooling apparatus an induced convection heat transfer between the contents of the hot, sealed, product-filled cans and the cooling medium employed.

A still further object is to provide a can cooling apparatus for processing a continuous procession of hot, sealed, product-filled cans, that is arranged to maintain said cans under complete and positive control during their transit through said coiling apparatus.

A still further object is to provide an apparatus for cooling hot, sealed product-filled containers during a relatively short time interval, which latter may be varied in accordance with the character of the container contents being processed.

A still further object is to provide an apparatus for subjecting hot, sealed, product-filled cans to the action of a cooling liquid of a predetermined or selected depth to thereby control the heat transfer between the contents of said cans and said cooling liquid in accordance with the heat retention properties of the particular commodity in said cans.

A still further object is to provide an apparatus which will effectively cool hot, sealed, product-filled cans in an economical manner.

A still further object is to provide a container cooling apparatus arranged to handle hot, product-filled containers in a gentle and smooth manner without subjecting same to harmful jars or shocks during their processing transmit through the apparatus.

Another object is to provide means for agitating the contents of filled and sealed containers during advancement of the same on a conveyor.

Another object is to provide a conveyor for canned goods, and, in combination therewith, means for subjecting the cans being conveyed, to a variety of motions to agitate their contents.

These and other objects and advantages of the present invention will become apparent from the following description and the accompanying drawings, in which:

Fig. 1 is a fragmentary side elevation of the left hand half of a can cooling apparatus embodying the present invention, wherein are mounted the feed and discharge mechanisms and the cooling water supply of the apparatus.

Fig. 2 is a similar elevation of the right-hand half of the cooling apparatus, whereon are mounted the drive mechanisms thereof.

Fig. 3 is an elevation of the drive end of the cooling apparatus taken in the direction of the arrows 3—3 in Fig. 2.

Fig. 4 is an elevation of the opposite end of the cooling apparatus taken in the direction of the arrows 4—4 in Fig. 1.

Fig. 5 is an enlarged fragmentary plan view of the drive end of the cooling apparatus, certain parts being omitted and certain other parts being shown in section for illustrative clarity.

Fig. 6 is an enlarged fragmentary longitudinal vertical section taken along line 6—6 of Fig. 3.

Fig. 6A is an enlarged detail view of a portion of Fig. 6.

Fig. 7 is an enlarged fragmentary horizontal section taken along line 7—7 of Fig. 6.

Fig. 8 is an enlarged fragmentary plan view of the can crossover end of the cooling apparatus, with certain parts broken away for sake of clarity.

Fig. 9 is an enlarged fragmentary longitudinal vertical section taken along line 9—9 of Fig. 4.

Fig. 10 is an enlarged fragmentary horizontal section taken along line 10—10 of Fig. 9.

Fig. 11 is an enlarged fragmentary, longitudinal vertical section taken along line 11—11 of Fig. 8.

Fig. 12 is a plan view of a can slow-down mechanism provided at the feed end of the cooling apparatus.

Fig. 13 is a side elevation thereof with certain parts being broken away for sake of clarity.

Fig. 14 is an enlarged fragmentary transverse vertical section taken along line 14—14 of Fig. 9.

Fig. 15 is an enlarged fragmentary underside perspective view of a sectional can runway of the cooling apparatus showing the runway rocking mechanism, certain parts thereof being broken away and certain other parts shown in section for sake of clarity.

Fig. 16 is an enlarged fragmentary perspective view of a gridded portion of a can runway of the cooling apparatus with certain parts broken away and shown in section to illustrate the cooling liquid supply basin beneath said gridded portion.

Fig. 17 is a fragmentary perspective view of the opposing ends of a pair of can runway sections and the flexible sealing interconnection therefor.

Fig. 18 is an enlarged longitudinal vertical section of a slightly modified type of can discharge chute having a drop-out door, said door being shown in its normal position in full lines and in its can drop-out or discharge position in dotted lines, and Fig. 19 is a plan view of said discharge chute as it would appear detached from the cooling apparatus.

General description

In general, the can cooling apparatus of the present invention, comprises a main support frame A (Figs. 1 and 2), a can propelling drive mechanism B, an oscillating runway drive mechanism C, a can propelling mechanism D, a can runway system E, runway rocking mechanism F, a can slow-down mechanism G, a can discharge means H, and a can cooling medium supply system I.

It will simplify an understanding of the invention if it is borne in mind that the illustrated can cooling apparatus embodies a series of looped triangular runways interconnected at a common end by crossovers to form a continuous helical path. In this manner, the overall length of the apparatus is held to a minimum, while still providing adequate length of can travel to effect proper and positive cooling of the can contents.

It will further simplify such an understanding if it is also borne in mind that the inclined portions or sections of the looped triangular runways are mounted for lateral rocking movement, so that endwise agitation is imparted to the contents of the cans rolling therealong, which endwise agitation combined with the spinning agitation imparted to the contents of the cans by the rolling of the same along said rocking runway sections insures of a more rapid and uniform cooling of said contents, than would otherwise result if only one type of agitation was relied upon to secure the cooling of the can contents.

While the present embodiment of the invention is particularly suited and is primarily designed as a can cooling apparatus, it is to be understood, that it may also be effectively and efficiently employed as a cooking apparatus for canned commodities.

Main support frame

The main support frame A (Figs. 1 and 2) may comprise a series of longitudinally aligned principal frame sections 30, 31, and 32, and auxiliary end sections 33 and 34, which sections are bolted or riveted together in aligned relation and are fabricated chiefly from angle bars.

Inasmuch as the principal frame sections 30, 31 and 32 are essentially identical in construction with only slight structural variations existing therebetween, which will be later described herein as they pertain to the individual frame sections, it is thought that a description of the intermediate principal frame section 31, as typical, will suffice for the other principal frame sections.

The frame section 31 is provided at each side thereof (Figs. 1, 2 and 14) with a series of upright angle bar members 35, which are rigidly secured in longitudinally aligned and uniformly spaced relation by oppositely inclined angle tie bars 36 and 37, which tie bars, as shown in Figs. 1 and 2, converge towards the right-hand ends thereof. The tie bars 36 and 37 may be bolted, riveted, or welded to the inner faces of the upright members 35 as desired or deemed expedient. The oppositely inclined or convergent angle tie bars 36 and 37 are secured to the upright members 35 of their respective frame sections 30, 31 and 32, at predetermined elevational points thereon, so that the inclined tie bars 36 and 37 of one frame section will be in matching alignment with the corresponding tie bars of an adjacent section, when the frame sections 30, 31 and 32 are assembled, as shown in Figs. 1 and 2.

The upright members 35 are also rigidly secured in laterally aligned and uniformly spaced relation by transversely disposed angle tie bars 38, which may be bolted, riveted or welded to the laterally or outwardly extending flanges of said upright members 35, at points thereon intermediate the oppositely inclined tie bars 36 and 37. Interposed between the upper ends of each pair of laterally aligned upright members 35, in abutting and flush relation therewith, is an angle brace bar 39, the ends of which are welded to said upper ends.

In addition to the tie bars 38 and brace bar 39, each pair of laterally aligned upright members 35 is also stiffened and reinforced laterally, at vertical spaced intervals, by appropriate diagonal braces, such as the diagonal braces 40 shown in Fig. 6.

The frame sections 30, 31 and 32, at their section abutting ends are reinforced and stiffened by diagonal angle bar braces 41 (Figs. 1 and 2), the terminal portions of which generally abut the outer sides of the oppositely inclined tie bars 36 and 37, respectively, and may be riveted or welded thereto, and also to the upright members 35, as shown in Fig. 2.

Mounted upon the inner faces of the upright members 35 of each of the frame sections 30, 31 and 32, at each side thereof, in spaced parallel relation to the upper edges of the oppositely inclined tie bars 36 and 37, are oppositely inclined composite tracks 42 and 43 (Figs. 1, 2, 11 and 14). Each of the composite tracks 42 and 43 consists of an angle bar 44 rigidly secured in spaced relation to its correlated upright members 35 by studs 45 and a slightly smaller angle bar 46 similarly secured to said upright members 35 by studs 47. When operatively assembled, the lower marginal portion of the outer face of the bar 46 is in abutment with the upper marginal portion of the inner face of the bar 44 and the inwardly extending flanges of said bars 44 and 46 are disposed in spaced parallel relation, to thus form a track therebetween, as more clearly shown in Fig. 14.

The oppositely inclined composite tracks 42 and 43 are secured to the upright members 35 of their respective frame sections 30, 31 and 32 at such elevations, that when said frame sections are assembled, as shown in Figs. 1 and 2, the composite track sections 42 and 43 thereof will be in matching alignment to thus form continuous upper and lower composite tracks on the frame A, which are substantially coextensive with the frame section assembly. Welded or riveted to the undersides of the oppositely inclined tie bars 36 and 37, at points thereon substantially midway the length of their respective frame sections 30, 31 and 32, are transversely disposed angle bars 48 (Figs. 1 and 2). Similarly secured to the undersides of the oppositely inclined tie bars 36 and 37, adjacent each end of their respective frame sections 30, 31 and 32, is a pair of angle crossbars 49 (Figs. 1, 11, 14 and 15), which are disposed in spaced parallel relation with their generally horizontal flanges facing inwardly.

Before passing from the general description of the principal frame sections of the frame A, it should be here noted, that the laterally aligned upright members 35a at the left-hand end of the frame section 30 differ structurally from the upright members 35 of said section, in that said members 35a are shorter and do not contact or rest upon the supporting floor surface S (Fig. 1), as do the frame supporting members 35.

The auxiliary end section 33 of the frame A is provided at each corner thereof with upright angle bar members 50 (Figs. 1, 4 and 8 to 11), which members are rigidly secured in longitudinally aligned and spaced relation, at and adjacent their upper and lower ends by longitudinally disposed angle tie members 51. The upright members 50 are similarly secured in laterally aligned and spaced relation at and adjacent their upper and lower ends by transversely disposed angle tie members 52. In addition to said tie members 52, the upright members 50, at the outer end of the section 33, are laterally braced by diagonal angle bar braces 53 (Figs. 1, 4 and 8 to 11).

The auxiliary end section 34 of the frame A is provided at each corner thereof with upright angle bar members 54 (Figs. 2, 3 and 5 to 7), which members are rigidly secured in longitudinally aligned and spaced relation, adjacent their lower ends, by angle bar stringers 55, which stringers also extend the full length of the principal frame section 32 (Fig. 2), to thereby rigidly interconnect the sections 32 and 34, and in addition fixedly retain the lower end portions of the upright members 35 of the section 32 in longitudinal spaced relation. The stringers 55 may be either riveted or welded to the inner faces of the upright members 35 and 55, as deemed expedient, and are laterally braced adjacent their outer ends by a transversely disposed and downwardly offset angle bar brace 56 (Figs. 2, 3 and 6) having the ends thereof in abutment with and welded to the inner sides of said stringers.

The upright members 54, at their upper ends, are rigidly maintained in both longitudinally and laterally aligned spaced relation in the following manner. Riveted or welded to the outwardly extending flanges of the upright members 54, at the upper ends thereof, are transversely disposed angle bar braces 57 (Figs. 2 and 3), and bolted or riveted to the outwardly extending flanges of said braces 57 is a transversely disposed rectangular top plate or platform 58. Additionally, the members 54 are also laterally braced, substantially midway the height thereof, by transversely disposed angle bar braces 59, which may be welded or riveted thereto, while the lower portions of the inner laterally aligned pair of upright members 54 are diagonally braced by the diagonal braces 40, previously described herein. The outer laterally aligned pair of upright members 54 are similarly braced by a pair of diagonal braces 60 (Figs. 3 and 6), which diagonal braces may be either riveted or welded to the upright members 54.

Can propelling drive mechanism

The can propelling drive mechanism B (Figs. 2, 3, 5 and 7) comprises an electric motor 61 mounted for adjustment within a dove-tail guideway 62 formed lengthwise within a motor base or pad 63 welded to the upper face of the rectangular plate 58 at one side and substantially midway the length thereof. A V-belt pulley 64 is keyed to the shaft 65 of the motor 61 and trained around said pulley 64 is an endless V-belt 66, which is also trained around a V-belt pulley 67 keyed to the power-input shaft 68 of a speed reducer unit 69 mounted upon the rectangular plate 58 adjacent one end thereof and in aligned relation with the motor 61. A slack take-up mechanism 70 serves to adjust the motor 61 within the dove-tail guideway 62 and thus tighten the V-belt 66 when any slack occurs therein.

Keyed to the power-output shaft 71 of the speed reducer unit 69 is a double-toothed sprocket wheel 72. Trained around this sprocket wheel 72 is an endless double sprocket chain 73, which is also trained around a double-toothed sprocket wheel 74 keyed to one end of a transversely disposed driving shaft 75.

The driving shaft 75 is journaled for rotation, adjacent its ends, within bearings 76 (Fig. 7) secured by bolts 77 to the outer faces of longitudinally disposed channel members 78 adjacent the inner ends thereof, the web portions of said channel members being suitably perforated to permit passage of the driving shaft 75 therethrough. The longitudinally disposed channel members 78, for a reason hereinafter made more apparent, are mounted at a predetermined elevation upon the outer faces of the upright members 54 of the end frame section 34. These channel members 78 are interposed between the outwardly extending flanges of the upright members 54 and are secured to the latter by bolts 79 (Figs. 5 and 7).

Keyed to the end of the driving shaft 75, opposite to that having the sprocket wheel 74, is a spur gear pinion 80 (Figs. 2 and 5), which pinion normally meshes with a spur gear 81 keyed to one end of a countershaft 82 disposed in spaced parallel relation to the driving shaft 75 and journaled adjacent its ends within bearings 83 (Fig. 7) secured by bolts 84 to the outer faces of the channel members 78 adjacent the outer ends thereof, the web portions of said channel members being suitably preferred to permit passage of the countershaft 82 therethrough.

Butt-welded to the edges of the opposing flanges of the upright members 54 in flush relation therewith at each side of the end frame section 34 and at the general elevation of the channel members 78, are rectangular equipment mounting plates 85, which are also suitably perforated to permit passage of the driving shaft 75 and countershaft 82 therethrough.

Oscillating runway drive mechanism

The oscillating runway drive mechanism C (Figs. 2, 3 and 5) comprises an electric motor 87 mounted for adjustment within a motor base or pad 88, in a manner substantially similar to that heretofore described for the motor 61 of the main drive mechanism B, said motor base 88 being welded to the upper face of the rectangular plate 58 at the opposite side thereof to that of the motor base 63 and in transverse staggered relation to the latter, as more clearly shown in Fig. 3.

A V-belt pulley 89 is keyed to the shaft 90 of the motor 87 and trained around said pulley 89 is an endless V-belt 91, which is also trained around a V-belt pulley 92 keyed to the power-input shaft 93 of a speed reducer unit 94 mounted upon a pedestal 95 welded upon the upper face of the rectangular plate 58 at one side and adjacent the opposite end thereof to that of the speed reducer unit 69.

Keyed to the power-output shaft 96 of the speed reducer unit 94 is a sprocket wheel 97 (Fig. 2) and trained around said sprocket wheel is an endless sprocket chain 98, which is also trained around sprocket wheels 99 and 100 and conventional slack take-up devices 101 and 102 (Figs. 2 and 3) carried by the pedestal 95 and a frame structure 86, respectively.

The sprocket wheels 99 and 100 are keyed, respectively, to the outer ends of the power-input shafts 103 and 104 of gear boxes 105 and 105a, respectively, which shafts are transversely disposed in spaced parallel relation, with the shaft 103 located at a predetermined distance beneath the inclined angle tie bar 36 of the frame section 32 adjacent the right-hand end thereof, while, the shaft 104 is located in vertically aligned relation to the shaft 103 at a similar distance beneath the oppositely inclined angle tie bar 37 of said frame section 32.

The power-input shafts 103 and 104 are journaled for rotation adjacent their outer ends in suitable bearings 106 (Fig. 5) carried by the frame structure 86 (Fig. 2) mounted upon and extending inwardly from one side of the end frame section 34, while the inner ends of said shafts 103 and 104 are journaled for rotation within their respective gear boxes 105 and 105a, which latter are supported in any suitable manner from the end frame section 34 at midpoint thereon, as more clearly shown in Fig. 3.

Can propelling mechanism

The can propelling mechanism D (Figs. 4, 5 to 11 and 14) comprises a pair of endless sprocket chains 109, the upper reaches of which are adapted to move or travel lengthwise within the inclined composite tracks 42 (Fig. 14), while, the lower reaches of said sprocket chains are adapted to similarly travel within the oppositely inclined composite tracks 43. The sprocket chains 109 at uniformly spaced intervals are provided with rollers 110 (Figs. 5, 8 and 14), which rollers are interposed between the links of said sprocket chains 109 and are rotatively mounted upon the link pins thereof. The rollers 110 serve and function to minimize friction between the composite tracks 42 and 43 and the upper and lower reaches of the sprocket chains 109 as they travel therethrough.

The lower reaches of the sprocket chains 109 upon leaving the inclined lower composite tracks 43 are immediately trained around driving sprocket wheels 111 (Fig. 6), which are keyed to the countershaft 82 adjacent the bearings 83 thereof (Fig. 7), and upon leaving said sprocket wheels 111, said sprocket chains 109 immediately enter the inclined upper composite tracks 42, to become the upper reaches of the sprocket chains.

The upper reaches of the sprocket chains 109 upon leaving the left-hand ends (Fig. 9) of the inclined upper composite tracks 42 are immediately trained around sprocket wheels 112 keyed to a transversely disposed idler shaft 113 journaled for rotation, adjacent its ends, within take-up bearings 114 (Fig. 1) of any well known or conventional type. These bearings 114 are operatively mounted upon longitudinally disposed and medially slotted channel members 115, which are interposed between the outwardly extending flanges of the upright members 50 of the auxiliary end frame section 33, adjacent the upper ends thereof, and are rigidly secured to the outer faces of said members 50 by bolts 116 (Figs. 1, 9, 10 and 11).

From the sprocket wheels 112 the sprocket chains 109 pass downwardly to form vertical reaches and to be trained around sprocket wheels 117, which are keyed to a transversely disposed idler shaft 118 journaled for rotation adjacent its ends within take-up bearings 119 (Fig. 1) of the same type as the bearings 114. The bearings 119 are operatively mounted upon longitudinally disposed and medially slotted channel members 120, which are also interposed between the outwardly extending flanges of the upright members 50 of the auxiliary end frame section 33, adjacent the lower ends thereof, and are rigidly secured to the outer faces of said members 50 by bolts 121 (Figs. 1 and 9). From the sprocket wheels 117 the sprocket chains 109 pass immediately into the left-hand ends (Fig. 9) of the inclined lower composite tracks 43 to become the lower reaches of said chains, thus completing the circuit of such chains which began at the right-hand ends of said tracks.

The sprocket chains 109 are interconnected at uniform intervals by transversely disposed tubular can propelling bars or flights 122, the terminals of which are mounted upon selected laterally aligned link pins 122a of said chains. The pitch or spacing of the tubular bars 112 upon the sprocket chains 109 is determined by the size of the cans to be cooled with only a working clearance for the cans provided between the peripheral surfaces of adjacent tubular bars 122, as and in the manner more clearly shown in Fig. 6.

*Can runway system*

The can runway system E is designed to provide a substantially continuous, upwardly inclined, looped runway of helical form, wherein and whereover the cans to be cooled, such as cans K, travel from the can entry end of said runway system to the can discharge end thereof.

The can cooling or treating zones of the helical runway comprise an upper series of inclined and rockable can runways 123 and a lower series of similar can runways 124 (Figs. 1, 2, 5 to 11 and 14 to 16), which can runways extend longitudinally in spaced parallel relation within the main support frame A and are substantially coextensive therewith. The upper series of can runways 123 is operatively mounted in a plane parallel to and beneath the plane of the upper flight of can propelling bars 122 (Fig. 14), while, the lower series of can runways 124 is similarly mounted in a plane parallel to and beneath the plane of the lower flight of can propelling bars 122.

To expedite and facilitate fabrication and assembly of the upper and lower series of can runways 123 and 124, respectively, it has been found desirable and convenient to construct every can runway of both the upper and lower series of runways in sections, each section of which is individual to and is operatively mounted upon a principal frame section of the main support frame A. As for example, every can runway 123 of the upper series consists of sections 125, 126 and 127 mounted, respectively, upon the frame sections 30, 31 and 32, while, every can runway 124 of the lower series consists of sections 128, 129 and 130 mounted, respectively, upon the frame sections 30, 31 and 32.

With the exception of certain slight structural differences in the end sections 125 and 127 of the upper series of can runways 123 and the end sections 128 and 130 of the lower series of can runways 124, all of the other runway sections of both series are substantially identical in construction, so that a description of one section will suffice for all including the end sections 125, 127, 128 and 130, to which such description generally applies, and any individual structural differences between these last mentioned sections and the other sections will be described later herein when deemed timely and appropriate.

For a general description of an individual can runway section reference will here be had to the can runway section 125, since the latter is illustrated in detail in Figs. 14, 15 and 16. The can runway section 125 comprises a relatively narrow elongated body member of trough-like cross-section, preferably fabricated from sheet metal, said body member having a bottom wall 131 and inwardly and upwardly bent convergent side walls 132, the upper edges of which are downwardly and inwardly bent to form guide rails 133 for the cans K moving along the can runway section 125.

Rigidly secured in spaced parallel relation to the upper surface of the bottom wall 131, as by flat-head bolts 134, and substantially coextensive with said bottom wall are two longitudinally extending, replaceable wear strips 135 upon which the beads of the cans K normally roll (Fig. 14). Welded at intervals, as at 136 (Fig. 15), to the lower surface of the bottom wall 131 and also substantially coextensive therewith are transversely spaced, longitudinally disposed, reinforcing or stiffening bars 137 of angular cross-section, the generally horizontal flanges of which extend inwardly in opposed relation, as and in the manner shown more clearly in Figs. 14 and 15.

Welded jointly to the underside of the bottom wall 131 and to the inner faces of the reinforcing bars 137 of the can runway section 125, adjacent the ends thereof, are T-shaped dependent rocker arms 138 having elongated leg portions, each of which is adapted to register with and normally extend downwardly between its associated pair of angle crossbars 49 located at a corresponding end of the frame section 30 (Figs. 6, 9 and 15).

To mount the can runway section 125 for rocking movement upon the angle crossbars 49, the cross-portion 139 of each of the T-shaped rocker arms 138 is provided with a longitudinally disposed sleeve bearing 140, which extends through said cross-portion 139 adjacent its upper edge and at a midpoint thereon. The sleeve bearing 140 is retained in lengthwise symmetrical relation and against rotative movement within the cross-portion 139 by a radially extending arm welded thereto, which arm is rigidly secured at its free end to the contiguous face of the cross-portion 139 by a round-head cap screw 142.

Journaled for rocking movement within the sleeve bearing 140 and extending therethrough is a rockshaft 143, the terminal portions of which normally project from the ends of said sleeve bearing 140 to seat within the perforated upper ends of plate bearings 144, which are substantially triangular in shape and are rigidly secured by round-head cap screws 145 to the outer faces of the angle crossbars 49 at midpoints thereon. The rockshaft 143 at one end thereof projects from the plate bearing 144 at said end to receive and be welded to the perforated upper end of a retention plate 146, which is rigidly secured to said plate bearing 144 by a round-head cap screw 147. The retention plate 146 functions to positively retain the rockshaft 143 against axial movement within the sleeve bearing 140 and also against rocking movement within the plate bearings 144.

In Fig. 15 and in the foregoing description the can runway section 125 is shown and described as equipped with T-shaped rocker arms 138 having elongated leg portions, but, it should be here noted and observed (Fig. 14), that only the can runway sections of the outside can runways of both the upper and lower series 123 and 124 of same are so equipped, and that the can runway sections of the intervenient can runways of both of said series are equipped with T-shaped rocker arms 148 having relatively shorter leg portions, for a reason which will shortly be made more apparent.

It is also important here to note and observe, that the rocking axes of the inclined rockable can runway sections of both the upper and lower series of can runways 123 and 124 should be located a sufficient distance below the axes of the can propelling bars 122, so that the axes of the cans K will substantially coincide with the axes of said bars 122 (Figs. 6, 9, 11 and 14), and thus positively assure of effective and positive propelling engagement of the bars 122 with the cans K.

The opposing ends of the individually rockable can runway sections 125, 126 and 127 of every upper can runway 123 and the corresponding ends of the individually rockable can runway sections 128, 129 and 130 of every lower can runway 124 are adapted to be flexibly interconnected in sealed watertight relation by strips of flexible sealing material 149 (Fig. 17), such as rubber or the like. The strips 149 are bonded or cemented to the undersides and outer convergent sides of said can runway sections and are also secured thereto by bolts 150. The flexible and sealed interconnections between the individually rockable can runway sections, just described, function to unite such sections to form the continuous upper and lower can runways 123 and 124 of the can cooling or treating zones of the present cooling apparatus.

For reasons which will hereinafter be made more apparent, the end can runway sections 125 and 128 of the upper and lower series of can runways 123 and 124 are not exactly coextensive with their correlated principal frame section 30; said runway sections terminate at their outer ends somewhat short of the outer end of said frame section (Figs. 1, 8, 9, 10 and 11). Similarly, the end can runway sections 127 and 130 of the upper and lower series of can runways 123 and 124 are not exactly coextensive with their correlated principal frame section 32; they also terminate at their outer ends somewhat short of the outer end of their frame section (Figs. 2, 5, 6 and 7).

The bottom wall 131 of each can runway section 125 of the upper series of can runways 123 is provided adjacent the outer end thereof with a series of spaced parallel transverse slots 151 (Figs. 8, 9, 11 and 16). Welded to the underside of the bottom wall 131 of each can runway section 125, in vertically aligned relation with the series of transverse slots 151 and embracing the same, is a longitudinally disposed, elongated, rectangular basin 152 (Figs. 9 and 16), which extends beyond said ports and in the bottom wall of said extension is provided with an inlet fitting 153.

Interposed between the upper and lower series of can runways 123 and 124 and extending transversely of the principal frame section 32 at the outer end thereof is an elongated rectangular catch basin 154 (Fig. 6) having a downwardly convergent bottom wall 155. Said catch basin 154 is disposed relative to the outer ends of the upper series of inclined can runways 123, in such a manner that the cooling or treating liquid flowing downwardly within said runways will upon reaching the outer ends of same cascade into and be caught by the basin 154. The catch basin 154 is jointly supported upon the frame section 32 and the auxiliary end section 34 (Fig. 6) by rigidly securing the upper edge portion of the inner wall of said catch basin with bolts 156 to a transversely disposed angle tie bar 157 welded at its ends to the undersides of the inclined angle tie bars 36 of the frame section 32, and by providing the outer wall of said catch basin, at or adjacent the ends thereof with laterally extending lugs 158, which are rigidly secured by bolts 159 to the inner faces of the inner upright members 54 of the auxiliary end section 34. Welded to the upper edge of the outer wall and sloping upwardly and outwardly therefrom is a transversely extending plate 160, which functions as a splash guard to prevent dispersal of the cooling liquid as the latter cascades from the can runways 123 into the catch basin 154.

The bottom wall 131 of each can runway section 130 of the lower series of can runways 124 is provided adjacent its outer end with a series of spaced parallel transverse slots 161 (Figs. 6 and 7). Welded to the underside of the bottom wall 131 of each can runway section 130, in vertically aligned relation with said series of transverse slots 161 and embracing same, is a longitudinally disposed, elongated, rectangular basin 162, which extends beyond said slots 161, and in the bottom wall of said extension is provided with an inlet fitting 163.

Inner and outer transversely extending panel guides 164 and 165, respectively (Figs. 2, 3, 5, 6 and 7), are provided to suitably guide and support the cans K as they pass upwardly from the lower series of can runways 124 to the upper series of can runways 123 during their travel through the cooling opparatus.

The inner panel guide 164 is substantially U-shaped in cross-section and is normally interposed lengthwise between the driving sprocket wheels 111 with the semicircular end thereof disposed in concentric spaced relation to the countershaft 82 and with its can contacting outer face disposed inwardly from the pitch circles of said sprocket wheels 111 a distance substantially equal to one-half the diameter of the beaded ends of the cans K.

Welded to the inner face of the U-shaped panel guide 164, in opposed relation adjacent the free ends thereof, are transversely extending angle bars 166, which serve and function to stiffen and reinforce the free ends of said panel guide in a lengthwise direction, and to also support same upon the equipment mounting plates 85 carried by the auxiliary end frame section 34. To effectuate such support, the angle bars 166 are provided at their terminals with lugs 167, which normally abut the mounting plates 85 and are rigidly secured thereto by bolts 168.

The can contacting outer face of the upper portion of the U-shaped inner panel guide 164 is normally disposed in the plane of the upper faces of the bottom walls 131 of the end can runway sections 127 of the upper series of can runways 123 (Fig. 6). Butt-welded to the inner edge of the upper portion of said panel guide, in flush relation therewith and at uniformly spaced intervals thereon, are inwardly extending togue-shaped plates 169, which are individual to and are disposed substantially in longitudinally aligned relation to said end can runway sections 127, with their inner ends disposed in spaced relation to the ends of such sections (Fig. 6) for a reason shortly to be described.

In order to furnish effective support for the cans K as they pass from support by the stationary inner panel guide 164 to support by the laterally rockable end can runway sections 127, rectangular flexible strips 170 (Figs. 5 and 6) are provided, which strips may be cut from sheet rubber or the like, and which are of a width substantially equal to that of said runway sections 127.

The flexible strips 170 normally rest upon the tongue-shaped plates 169 and span the gaps between said plates and the outer ends of the can runway sections 127. The strips 170 at their outer ends are secured by a series of flat-head bolts 171 to the outer ends of said plates 169, and at their inner free ends said strips are adapted to be inserted and seat within transverse strip retention recesses 172 provided at the outer ends of said runway sections 127.

The strip retention recesses 172 are formed upon the outer ends of the can runway sections 127 by jointly utilizing the bottom walls 131 of same and relatively thin transversely disposed bars 173, the marginal side portions of which, adjacent the ends thereof, are superimposed upon and are spot-welded to the terminal portions of the wear strips 135 of said runway sections 127, which wear strips for the present purpose terminate slightly short of the ends of their respective runway sections, as shown more clearly in Fig. 6A. In order to better insure frictional retention of the inner free ends of the flexible strips 170 within their correlated strip retention recesses 172, said strips should and must have a minimum thickness at least equal to that of the wear strips 135.

Each rectangular flexible strip 170, adjacent its inner end is provided with a transversely disposed row of rectangular openings 174 (Figs. 5 and 6) wherethrough the can cooling or treating liquid flowing downwardly within its associated can runway 123 cascades from the end thereof into the transversely extending catch basin 154.

To prevent axial displacement of the cans K, as they pass around the U-shaped inner panel guide 164, during their transfer from guidance by the lower can runways 124 to guidance by the upper can runways 123 superimposed thereabove, a pair of vertically disposed can guide members 175, one right-hand and one left-hand, is provided for each lower can runway 124 and its associated upper can runway 123 superimposed thereabove.

The right and left-hand can guide members 175 may be fabricated from either round or square bar stock and are bent or looped lengthwise to substantially conform in vertical contour to the lay of the endless sprocket chains 109 as they pass over the driving sprocket wheels 111 as shown in Fig. 6.

The upper leg portions of the right and left-hand can guide members 175 are somewhat shorter than their lower leg portions, since said upper leg portions terminate adjacent the outer ends of the can runways 123, while said lower leg portions overlap the outer end portions of the outer ends of the lower can runways 124 and have their terminals 176 bent outwardly to facilitate entrance of the cans K between each pair of right and left-hand can guide members 175. The terminals of adjacent right and left-hand guide members 175 may have their terminals 176 welded together if desired. The right and left-hand can guide members 175 are carried by the U-shaped inner panel guide 164 and are rigidly secured thereto in spaced parallel relation by studs 177 (Fig. 6), and are so located therein that their can contacting faces 178 are substantially disposed in the vertical planes of the can guide rails 133 of their associated superimposed can runways 123 and 124.

The transversely extending outer panel guide 165 is substantially J-shaped in cross-section and is normally interposed between and in spaced relation to the upright members 54 of the auxiliary end frame section 35 with the semi-circular end thereof disposed in concentric spaced relation to the inner guide panel 164 and with its can contacting inner face disposed outwardly from the pitch circles of the driving sprocket wheels 111 a distance substantially equal to one-half the diameter of the beaded end of the cans K.

Welded in spaced parallel relation to the underside of the J-shaped outer panel guide 165 are transversely extending angle bars 179, which serve and function to stiffen and reinforce the lower leg portion of said panel guide in a lengthwise direction, and to also operatively support same upon the equipment mounting plate 85. To effectuate such support, the angle bars 179 are provided at their ends with lugs 180, which normally abut the mounting plates 85 and are rigidly secured thereto by bolts 181. Also welded to the outer panel guide 165 upon its outer face and adjacent its upper free edge is a stiffening or reinforcing angle bar 182 (Figs. 3 and 6) and the end portions of the vertical flange of which abut the laterally extending flanges of the outer upright members 54 of the auxiliary end frame section 34 and are rigidly secured thereto by bolts 183.

The semi-circular end portion of the outer panel guide 165 is provided lengthwise thereof with a series of uniformly spaced vertical inspection openings 184 of rectangular formation (Figs. 3 to 7), which openings are individual to and are disposed in longitudinal alignment with the can runways 123 and 124. Welded to the inner face of said semi-circular end portion midway of said openings 184 and also at the ends of the panel guide 165 are inwardly extending reinforcing or stiffening ribs 185 (Figs. 6 and 7).

The can contacting inner face of the rectilinear portion 186 of the outer panel guide 165 is normally disposed in the plane of the upper faces of the bottom walls 131 of the end can runway sections 130 of the lower series of can runways 124 (Fig. 6). Butt-welded to the inner edge of said rectilinear portion 186 in flush relation therewith and at uniform intervals thereon, are inwardly extending tongue-shaped plates 187, which are individual to, and are disposed in, substantially longitudinally aligned relation to said end can runway sections 130, with their inner edges disposed in spaced relation to the ends of the bottom walls 131 of said sections, as shown in Fig. 6.

In order to furnish effective support for the cans K as they pass from support by the laterally rockable end can runway sections 130 to support by the outer guide panel 165, rectangular flexible strips 188 (Figs. 6 and 7) are provided, which strips are of the same material and of the same width as the rectangular flexible strips 170 previously described herein.

The flexible strips 188 normally rest upon the tongue-shaped plates 187 and span the gaps between said plates and the outer ends of the can runway sections 130. The strips 188 at their outer ends are secured to the outer ends of the plates 187 by a series of flat-head bolts 189, and at their inner free ends are adapted to be inserted and seat within transversely disposed strip retention recesses provided at the outer ends of the can runway sections 130, such recesses being similar in construction to the recesses 172, shown in Fig. 6A.

Hairpin-shaped guides 192 (Figs. 5 and 6), having their looped convergent ends 193 extending in a direction opposite to that of the upwardly moving cans K, are provided to prevent axial displacement of said cans as they pass from guidance by the upper leg portions of the can guide members 175 to guidance by the can guide rails 133 of the upper can runway sections 127. Accordingly, the guides 192 are disposed to overlap the can runway sections 127 and the upper leg portions of the can guide members 175, as shown more clearly in Fig. 5. Since each hairpin guide 192 is common to and serves adjacent can runway sections 127, it is necessary to provide single right- and left-hand guides 194 and 195, respectively, for the outer sides of the outside can runway sections 127 to thereby complement the hairpin guides 192 at the inner sides of said outside can runway sections 127. For an obvious reason, the single right- and left-hand guides 194 and 195 are provided at their outer or can receiving ends with outwardly bent terminal portions 196 and 197, respectively.

The hairpin guides 192 and the right- and left-hand guides 194 and 195 are normally disposed to lie in a plane somewhat above that of the upper reaches of the endless sprocket chains 109 and their associated can propelling bars or flights 122, and are carried in suspension thereat by studs 198 from transversely extending spaced parallel angle bars 199. The angle bars 199 are rigidly secured at their ends by bolts 200 to the upper ends of upright angle bar members 201, the lower ends of which are welded to the outer sides of the inclined upper angle tie bars 36 of the main frame A (Figs. 2 and 5).

At the crossover or transfer end of the can cooling apparatus, the several rows of the cans K are carried downwardly by the can propelling bars or flights 122 associated with the vertical reaches of the endless sprocket chains 109, and during such downward movement each row of the cans K travels in a diagonal path from the discharge end of one tier of superimposed runways 123—124 to the can receiving end of the next or succeeding tier of superimposed runways 123—124.

As the several rows of the cans K move diagonally downward, as above described, said rows of cans K are held in their proper course by transversely extending, vertically disposed, inner and outer panel guides 202 and 203, respectively (Figs. 1, 4 and 8 to 10). The transversely extending and vertically disposed inner panel guide 202 is curved inwardly at the upper end thereof to provide thereat an inwardly extending can supporting portion 204 disposed in substantially perpendicular relation thereto, and is similarly curved at the lower end thereof to provide a similarly extending can guiding portion 205 also in substantially perpendicular relation thereto.

The inner panel guide 202 is adapted to be mounted, adjacent the upper and lower curved ends thereof, upon the transversely disposed upper and lower sprocket shafts 113 and 118, respectively, in such a manner as to have said upper and lower curved ends disposed in concentric spaced relation to their respective sprocket shafts (Fig. 9). Accordingly, the sprocket shafts 113 and 118 are provided with concentric stationary sleeves 206 and 207, respectively, which are substantially coextensive with their respective shafts and wherein the latter are free to rotate. The sleeves 206 and 207 are maintained and retained against axial movement upon their respective shafts in any well known manner.

The curved upper end portion of the inner panel guide 202 is rigidly secured, adjacent the side edges thereof, to the end portions of the sleeve 206 by gusset plates 208, which are perforated to permit passage therethrough of said sleeve end portions, and which are welded to both the inner panel guide 202 and the sleeve 208. The curved lower end portion of the inner panel guide 202 is rigidly secured, adjacent the ends thereof, to the end portions of the sleeve 207 by an outwardly extending arm 209 which is welded at its inner end to the sleeve 207 and is secured at its outer end by a bolt 210 to an arcuate reinforcing or stiffening rib 211 welded to the curved lower end portion of the inner panel guide 202, as shown in Fig. 9.

The can supporting portion 204 extending inwardly from the upper end of the inner panel guide 202 normally rests upon and is secured at its inner end to the upper face of a transversely extending angle bar 212, which bar is welded at the ends thereof to the inner faces of the laterally aligned inner upright members 50 of the auxiliary end frame section 33.

Butt-welded to the back of the angle bar 212, in flush relation with the upper face thereof and at uniform intervals thereon, are inwardly extending, tongue-shaped plates 213, which are individual to and are disposed in longitudinally aligned relation to the end sections 125 of the can runways 123, with their inner ends disposed in flush and spaced relation to the outer ends of the bottom walls 131 of said runway sections, as shown more clearly in Fig. 9.

To furnish adequate support for the cans K, as they pass from support by the laterally rockable runway sections 125 to support by the inwardly extending can supporting portion 204, rectangular flexible strips 214 (Figs. 8 and 9) are provided, which strips are of the same material as, and are substantially identical to, the rectangular flexible strips 170 and 188 previously described herein.

The flexible strips 214 normally rest upon the tongue-shaped plates 213, in flush and abutting relation with the edge of the inwardly extending can supporting portion 204, and function thereat to span the gaps between said plates 213 and the outer ends of the runway sections 125. The strips 214 at their outer ends are secured by a series of flat-head bolts 215 to the outer ends of the tongue-shaped plates 213, and at their inner free ends are adapted to seat within transversely disposed strip retention recesses provided at the outer ends of said runway sections 125, such recesses being similar in construction to the recesses 172, shown in Fig. 6A.

Welded to the exterior face of the vertical portion of the transversely extending inner panel guide 202 are a series of diagonally disposed angle bars 217 (Figs. 9, 10 and 11), which angle bars are provided to adequately reinforce and suitably stiffen said vertical portion and thereby effectually prevent buckling of same.

During the diagonal downward travel of the several rows of cans K from the can discharge ends of the upper series of can runways 123 to the can receiving ends of the lower series of can runways 124, as and in the manner hereinbefore described, said rows of cans K are caused to travel in diagonally disposed can guideways 218 (Fig. 4), which guideways also hold the individual cans of said rows against axial displacement therein. The can guideways 218 are formed by providing left-hand guide members 219 and right-hand guide members 220 (Figs. 4, 9, 10 and 11), which guide members 219 and 220 are arranged in pairs, each pair thereof being common to and being located between adjacent rows of the cans K.

The left-hand and right-hand can guide members 219 and 220 are preferably fabricated from round or square bar stock and at their upper ends are bent to curve inwardly to provide generally horizontal, inwardly extending legs 221, which terminate adjacent the outer ends of the can runway sections 125 (Figs. 9 and 11). The guide members 219 and 220 are also bent at their lower ends to curve inwardly to provide somewhat upwardly inclined, inwardly extending legs 223, which together with extensions 223a thereof considerably overlap the outer end portions of the lower can runway sections 128, as and in the manner more clearly shown in Figs. 9 and 10, to thus insure effective and proper guidance of the cans K as they change their direction of travel from the vertical in the can guideways 218 to a somewhat upwardly inclined direction in the end sections 128 of the can runways 124. The extensions 223a are butt-welded to the ledge 223 and are also supported in suspension by studs 223b from a transversely extending angle bar 223c carried by outwardly and upwardly inclined, spaced parallel, angle bars 223d, the upper outer ends of which are welded to the inner panel guide 202.

The upper and lower inwardly extending legs 221 and 223 of the guide members 219 and 220 are normally disposed in laterally offset relation an amount equal to the center distance between adjacent can runways 125 or adjacent can runways 128. Accordingly, the guide members 219 and 220, adjacent their curved upper ends, are each bent laterally, as at 224 (Fig. 4), to extend diagonally downwards and are again bent laterally in a reverse direction, adjacent their curved lower ends, as at 225 (Fig. 4).

Each pair of right and left-hand guide members 219 and 220 are rigidly interconnected in spaced parallel relation at their upper and lower curved ends by quarter-turn webs 226, and intermediate said curved ends are similarly interconnected by linear webs 227, which webs 226 and 227 are welded to said guide members 219 and 220 and serve to unite same as a unit and in addition to reinforce said members.

By referring to Fig. 4, it will be obvious that the outside can guideways 218, at each side of the apparatus, each require only a single guide member for the outer side thereof, a left-hand guide member 219a at the outer side of one of said outside can guideways 218 (visible at the right side in Fig. 4) and a right-hand guide member 220a at the outer side of the other outside can guideway 218 (visible at the left side in Fig. 4). Welded to the outer sides of the single guide members 219a and 220a are linear reinforcing webs 228 (Fig. 4).

The interconnected pairs of right- and left-hand guide members 219 and 220 and the single right- and left-hand guide members 219a and 220a are mounted upon the interior face of the inner panel guide 202 and are fixedly secured thereto in spaced parallel relation by studs 229, and when so mounted said guide members 219, 220, 219a and 220a are disposed inwardly of and adjacent to the path of travel of the can propelling bars or flights 122 with only a slight working clearance between the peripheries of said bars and those of said guide members, substantially as and in the manner shown in Fig. 9.

Before passing from a description of the guide members 219, 220, 219a and 220a, it might be well to state that the can contacting faces of the inwardly extending upper legs 221 of said guide members are substantially disposed in the vertical planes of the can guide rails 133 of their correlated end runway sections 125 and that the inwardly extending lower legs 223 of said guide members are similarly disposed in the vertical planes of the can guide rails 133 of their correlated end runway sections 128.

The transversely extending and vertically disposed outer panel guide 203 is curved inwardly at its upper end to provide an inwardly extending, upwardly flaring, can guiding portion 230, which is reinforced and stiffened by a transversely extending angle bar 231, that is welded thereto exteriorly thereof. The outer panel guide 203 is curved inwardly at its lower end to provide an inwardly extending can supporting portion 232 disposed in substantially perpendicular relation thereto.

Welded at their outer edges to the ends of the outer panel guide 203 and generally conforming to the configuration thereof are inwardly extending, relatively narrow, side walls or panels 233. Mounted upon the inner faces of the side walls 233 in spaced parallel relation are vertically disposed angle bar guide members 234 and 235, respectively (Figs. 9, 10 and 11), which members are provided to guide the vertical reaches of the endless sprocket chains 109 during their downward travel from the sprocket wheels 112 to the sprocket wheels 117. The guide members 234 and 235 are substantially co-extensive with the linear portions of the end walls 233 and are fixedly secured thereto by flat-head bolts 236.

The outer panel guide 203 is adapted to be mounted upon the auxiliary end frame section 33, and when so mounted is adapted to have the upper and lower curved ends of same disposed in concentric spaced relation to the corresponding curved ends of the inner panel guide 202, as shown more clearly in Figs. 9 and 11. For this purpose, the upper longitudinally disposed angle tie bars 51, at each side of said section 33, are provided with dependent panel guide mounting plates 237 (Figs. 1, 4, 9 and 11), which plates are welded to the undersides and intermediate the length of said tie bars 51 and have their lower portions normally disposed in abutting relation with the upper curved portions of the side walls 233, which are fixedly secured thereto by flat-head bolts 238. For the same purpose, the lower longitudinally disposed angle tie bars 51, at each side of the section 33, are provided with upright panel guide mounting plates 239, which are welded to the upper sides and intermediate the length of said lower tie bars 51 and have their upper portions normally disposed in abutting relation with the lower curved portions of the side walls 233, which are fixedly secured thereto by flat-head bolts 240.

Superimposed upon and welded to the upper face of the inner, lower transversely disposed angle tie member 52 of the auxiliary end frame section 33, at uniform intervals thereupon are the outer end portions of inwardly extending, tongue-shaped plates 241, which are individual to and are disposed in longitudinally aligned relation to the end runway sections 128, with their inner ends disposed in flush and spaced relation to the outer ends of the bottom walls 131 of said runway sections, as shown more clearly in Fig. 9.

The can supporting portion 232 extending inwardly from the lower end of the outer panel guide 203 normally rests at its inner end upon the outer end portions of the tongue-shaped plates 241 and is fixedly secured thereto and to the tie member 52 by flat-head bolts 242 (Fig. 9).

To provide adequate support for the cans K, as they pass from support by the can supporting portion 232 to support by the laterally rockable can runway sections 128, rectangular flexible strips 243 (Figs. 9 and 10) are provided which are of the same material and are substantially identical to the flexible strips 170, 188 and 214 hereinbefore described.

The flexible strips 243 normally rest upon their correlated tongue-shaped plates 241, in flush and abutting relation with the edge of the inwardly extending can supporting portion 232 and normally function to span the gaps between the plates 241 and the outer ends of the can runway section 128. The strips 243 adjacent their outer ends are secured to the tongue-shaped plates 241 by a series of flat-head bolts 244 and at their inner free ends are adapted to seat within transversely disposed strip retention recesses provided at the outer ends of the can runway sections 128, such recesses being similar in construction to the recesses 172 shown in Fig. 6A.

The vertically disposed portion of the outer panel guide 203 is provided lengthwise thereof with a dual series of uniformly spaced inspection openings 246 (Figs. 4 and 9) which openings are of substantially rhomboidal formation and are arranged in oblique tandem relation in alignment with the can guideways 218 carried by the inner panel guide 202. The outer panel guide 203 is reinforced and stiffened around the edges of the openings 246 by upper and lower transversely extending angle bars 247, intermediate angle bar sections 248, and obliquely disposed angle bars 249, which extend between said upper and lower angle bars 247. The vertically disposed portion of the outer panel guide 203 is also provided in the upper right-hand corner thereof (Fig. 4) with a vertically disposed inspection opening 250 of rectangular formation. Formed in the curved upper portion of the outer panel guide 203 in aligned relation with the end runway section 125, which functions as the discharge section of the apparatus, is a can discharge opening 251 (Figs. 4, 8 and 11).

Hairpin-shaped guides 252 (Figs. 8, 9 and 11) having their looped convergent ends 253 extending in a direction opposite to that of the ascending cans K, are provided to prevent axial displacement of said cans as they pass from guidance by the can guide rails 133 of the upper runway sections 125 to guidance by the can guideways 218. Accordingly, the guides 252 are disposed to overlap the runway sections 125 and the can guideways 218, as shown more clearly in Fig. 9. Since each hairpin-shaped guide 252 is common to and serves adjacent runway sections 124 and can guideway 218, it is necessary to provide single left- and right-hand guides 254 and 255, respectively, for the outer sides of the outside runway sections 125 and can guideways 218 to thereby complement the hairpin-shaped guides 252 at the inner sides of said outside runway sections 125 and can guides 218. For an obvious reason, the single left- and right-hand guides 254 and 255 are provided at their inner or can receiving ends with outwardly bent terminal portions 256 and 257, respectively.

The hairpin-shaped guides 252 and the left- and right-hand guides 254 and 255 are normally disposed to lie in a plane somewhat above that of the upper reaches of the can propelling bars or flights 122, and are carried in suspension adjacent their inner ends by studs 258 from a transversely extending angle bar 259 and adjacent their outer ends by studs 260 from a transversely extending angle bar 261. The angle bar 259 is rigidly secured at its ends by bolts 262 to the upper ends of upright angle bar members 263, the lower end portions of which are welded to the outer sides of the inclined upper angle tie bars 36 of the main frame A (Figs. 1, 8 and 9). On the other hand, the angle bar 261 is rigidly secured intermediate the length thereof by bolts 264 to the underside of the inner, upper, transversely extending angle tie member 52 of the auxiliary end frame section 33 (Figs. 1, 8 and 9).

Runway rocking mechanisms

The runway rocking mechanisms F (Figs. 1, 2, 3, 6, 9, 11 and 14) for the can runway sections 125, 126 and 127 of the upper series of can runways 123 and for the can runway sections 128, 129 and 130 of the lower series of can runways 124 are all identical in construction and a description of one such rocking mechanism will therefore suffice for all. It should be here understood that an upper pair and a lower pair of rocking mechanisms F are provided upon each of the frame sections 30, 31 and 32 for the upper and lower series of can runway sections thereof and that the upper pairs of rocking mechanisms F are interconnected in longitudinally aligned relation with the upper power-output shaft of the gear box 105 for operation thereby, while the lower pairs of rocking mechanisms F are interconnected in similarly aligned relation with the lower power-output shaft of the gear box 105a for operation thereby.

Each runway rocking mechanism F comprises axially aligned bearings 265 (Figs. 1, 2 and 14), which bearings are mounted, in any well known manner, upon the outer faces of the angle crossbars 49 midway the length thereof. A longitudinally disposed stub shaft 266 is journaled within the bearings 265. Keyed to the stub shaft 266 intermediate said bearings and in side by side relation are oppositely disposed eccentric discs 267 having straps 268 freely mounted thereon. Rigidly secured at their inner ends to the straps 268 are outwardly and transversely extending actuating rods 269, the outer ends of which are pivotally connected by pivot pins 270 to the perforated lower terminal portions of the T-shaped dependent rocker arms 138. The lower terminal portions of the rocker arms 138 are provided lengthwise thereof with a series of aligned, uniformly spaced, perforations 271 for the selective reception of the pivot pins 270, whereby varying degrees of rocking movement of said rocker arms may be obtained, as will be manifest and apparent by referring more particularly to Fig. 14.

Each T-shaped dependent rocker arm 138 is connected by a pair of transversely extending links 272 to the dependent rocker arms 148 of two intervenient can runway sections, whereby said arms 148 will rock congruently with their correlated rocker arm 138. The links 272 are pivotally connected to the arms 138 and 148, as by bolts 273 or the like.

By oppositely disposing the eccentric discs 267 in the manner herein shown and described, the can runway sections on each side of the longitudinal center of the can cooling apparatus are caused to rock in opposite directions, i. e., they rock simultaneously outwards or simultaneously inwards, substantially as and in the manner shown in dotted lines in Fig. 14. This arrangement serves to counterbalance the stresses set up by the rocking can runway sections, and thus relieve the apparatus of such stresses.

The pair of rocking mechanisms F of each can runway section are interconnected by a longitudinally disposed shaft 274, the ends of which are connected by couplings 275 to the opposing inner ends of the stub shafts 266 of said rocking mechanisms. The shaft 274 is supported for rotation substantially midway the length thereof within a bearing 276 mounted upon the transversely disposed angle bar 48 of the frame section with which said can runway section is associated.

The outer ends of the stub shafts 266 of the rocking mechanisms F of contiguous can runway sections are interconnected by a longitudinally disposed shaft 277. For this purpose the outer ends of said stub shafts are connected by couplings 278 to the opposing ends of said interconnecting shaft 277. The outer drive ends of the outer stub shafts 266 of the rocking mechanisms F of both the upper and lower runway sections 177 and 130 are connected by couplings 279 to the upper and lower power-output shafts, respectively, of the gear boxes 105 and 105a.

Can slow-down mechanism

The can slow-down mechanism G (Figs. 1, 8, 9, 10, 12 and 13) comprises a longitudinally extending channel frame member 280, which is superimposed in spaced, vertically aligned, relation to the can receiving end of the initial can runway section 128 which is the rearmost section as viewed in Fig. 10. The channel member 280 is supported at its outer end upon, and is fixedly secured by bolts 281 to the outer end of a transversely extending angle bar 282. Said angle bar 282 has cantilever support from, and is welded at its outer end to, the upper end portion of a substantially vertical angle bar upright 283 which has its lower end portion welded to the outer face of the inclined angle tie bar 37 on the rear side of the frame section 30 (Fig. 10). The channel frame member 280 at its inner end rests upon and is fixedly secured, in any well known manner, to the lowermost, transversely disposed, angle tie bar 38 of the laterally aligned upright members 35 at the left-hand end of the frame section 30.

Rigidly secured in spaced parallel relation upon the underside of the outer end portion of the channel frame member 280, as by welding or the like, are transversely disposed bearings 284, 285 and 286, respectively, which are substantially coextensive with the width of said channel frame member 280. Journaled for rotation within the bearings 284, 285 and 286 are transversely disposed shafts 287, 288 and 289, respectively. Mounted upon the projecting ends of the shafts 287, 288 and 289 with their hubs in abutment with the ends of the bearings 284, 285, 286 are pairs of rubber-tired, slow-down wheels 290, 291 and 292, which are arranged in longitudinally aligned rows on the outer and inner sides of the channel frame member 280 and are fixedly secured to their individual shafts for rotation therewith, as by pins 293.

Mounted for independent rotation upon the outer end of the shaft 287 is a hub 294 having a sprocket pinion 295 and a sprocket wheel 296 rigidly secured thereon in axially spaced relation. The hub 294 is normally maintained in abutment with the hub of the outer slow-down wheel 290 and against axial displacement upon the shaft 287 by a set collar 297 fixedly secured to said shaft by a pin 298. Rigidly secured by a pin 299 to the inner end of the shaft 287 and normally abutting the hub of the inner slow-down wheel 290 is a sprocket pinion 300. Fixedly secured by a pin 301 to the inner end of the shaft 288 and normally abutting the hub of the inner slow-down wheel 291 is a sprocket wheel 302 which is located upon the shaft 288, so that it is disposed in longitudinally aligned relation with the sprocket pinion 300 of the shaft 287. Fixedly secured by a pin 303 to the outer end portion of the shaft 289 and normally abutting the hub of the outer slow-down wheel 292 is a sprocket pinion 304, which is located upon the shaft 289, so that it is disposed in longitudinally aligned relation with the sprocket wheel 296 of the shaft 287. Similarly secured by a pin 305 to the inner end portion of the shaft 289 and normally in abutment with the hub of the inner slow-down wheel 292 is a sprocket wheel 306, which is located upon the shaft 289, so that it is disposed in longitudinally aligned relation with the sprocket wheel 302 of the shaft 288 and the sprocket pinion 300 of the shaft 287. Trained about the sprocket wheel 296 of the shaft 287 and about the sprocket pinion 304 of the shaft 289 is an endless sprocket chain 307. Trained about the sprocket pinion 300 of the shaft 287 and about the sprocket wheel 306 of the shaft 289, and also intermeshing with the intermediate sprocket wheel 302 of the shaft 288, at substantially diametrical points thereon, is an endless sprocket chain 308.

The can slow-down mechanism G is driven by one of the sprocket wheels 117 (Fig. 9) and for such purpose a sprocket wheel 309 is fixedly secured by bolts 310 to the inner face of said sprocket wheel 117 in axially aligned and spaced relation thereon. Trained about the sprocket wheel 309 and the sprocket pinion 295 of the shaft 287 is an endless sprocket chain 311. A conventional slack take-up device 312 (Fig. 9) is provided for the sprocket chain 311, which device is operatively mounted upon the inner face of the adjacent upright member 35a of the frame section 30.

Fixedly secured by bolts 313 to the underside of the channel frame member 280 is a transversely extending hanger member 314 (Figs. 12 and 13) preferably fabricated from rectangular bar stock and having its terminal portions 314a downwardly directed and normally interposed between the slow-down wheels 290 and 291. Similarly secured by bolts 315 to the under side of the channel frame member 280, in spaced parallel relation to the hanger member 314, is another transversely extending hanger member 316 having its terminal portions 316a downwardly directed and normally interposed between the slow-down wheels 291 and 292. Mounted upon the inner terminal portion 314a of the hanger member 314 is a conventional slack take-up device 317 for the endless sprocket chain 308. Similarly mounted upon the outer terminal portion 316a of the hanger member 316 is a conventional slack take-up device 318 for the endless sprocket chain 307.

A longitudinally disposed, inwardly and downwardly inclined can track section 319 (Figs. 9, 12 and 13) is superimposed in spaced relation to the can receiving end of the initial can runway section 128 and is of a width substantially equal to the distance between the guide rails 133 of said can runway section. The can track section 319 comprises longitudinally disposed angle side bars 320 interconnected in face to face, spaced parallel relation by transversely extending bars 321, the end portions of which are welded to the under sides of the side bars 320. Welded to the outer faces of the angle side bars 320 in flush relation with the outer ends thereof are relatively short, generally vertical angle bars 322 for a purpose shortly to be described.

The hanger members 314 and 316 are primarily provided to support the can track section 319 in relation to the can receiving end of the initial can runway section 128. Accordingly, the terminal portions 314a and 316a, respectively, of said hanger members are welded to the outer faces of the angle side bars 320, substantially as and in the manner shown in Figs. 9 and 13.

Disposed adjacent the inner lower end of the track section 319 and at an elevation intermediate that of said inner lower end in a manner effective to overlie the initial can runway section 128 is a transversely extending can receiving plate 323 having a downwardly bent tongue portion 324 at its inner end (Figs. 9 and 10). The can receiving plate 323 is mounted upon and has cantilever support from the angle bar 44 of the adjacent composite track 43 by having the outer edge portion thereof rigidly secured by bolts 325 to the under side of said angle bar 44. In this connection, it is important here to note, that the convergent side walls 132 and guide rails 133 of the initial can runway section 128 are cut away and inwardly flared, as at 128a, to facilitate and permit free entry of the cans K dropping off the tongue portion 324 into said initial can runway section 128 during the rocking of same.

Fixedly secured by bolts 326 to the angle bars 322 of the track section 319 is the inner end of a quarter-turn feed chute 327 of a conventional type, and similarly secured by bolts 328 to the outer end of said chute 327 is the lower or delivery end of an inclined can feed trough 329, also of a conventional type, for supplying sealed product-filled cans K to the cooling apparatus from a processing unit, such as a cooking retort, sterlizing unit, or other source of heated cans (not shown).

The primary function of the can slow-down mechanism G is to slow the movement of the cans K as they travel downwardly within the track section 319 and thereby prevent said cans from violently hitting the can propelling bars or flights 122 upon dropping off the can receiving plate tongue 324 into the pocket formed by consecutive can propelling bars 122 and the guide rails 133 of the initial can runway section 128.

In the operation of the can slow-down mechanism G the sprocket pinion 295 and sprocket wheel 296 are driven by and at substantially twice the speed of the driving sprocket wheel 309 since the gear ratio between said sprocket wheel 309 and the sprocket pinion 295 is approximately 2:1. The gear ratio between the sprocket wheel 296 and the sprocket pinion 304 is also approximately 2:1, hence, the shaft 289 together with its can slow-down wheels 292 and its sprocket wheel 306 are driven by and at substantially twice the speed of the sprocket wheel 296. The gear ratio between the sprocket wheel 306 and the sprocket wheel 302 is approximately 2:1.5, hence, the shaft 288 together with its can slow-down wheels 291 is driven by and at substantially one and one-half times the speed of the sprocket wheel 306. The gear ratio between the sprocket wheel 306 and the sprocket pinion 300 is approximately 2:1, hence, the shaft 287 together with its can slow-down wheels 290 is driven by and at substantially twice the speed of the sprocket wheel 306.

From the foregoing and by referring to Figs. 9 and 13, it will be manifest and apparent that as each can K enters the track section 319 the beads or chimes of same will peripherally contact the slow-down wheels 290 and will be initially slowed thereby, then as said can travels downwardly within said track section will similarly and successively contact the slower slow-down wheels 291 and the still slower slow-down wheels 292, so that upon leaving the track section 319 the momentum of said can will have been sufficiently slowed to prevent any damage to the can and/or can propelling bars 122 and will assure of the can dropping gently and without any undue shock into the pocket formed by said bars 122 and the guide rails 133 of the rocking can runway section 128.

*Can discharge means*

The can discharge means H (Figs 1, 4, 8, and 11) comprises a conventional type of quarter-turn discharge chute 330, the inner end portion of which extends within the discharge opening 251 of the outer panel guide 203 to a point adjacent the downwardly traveling can propelling bars 122, as and in the manner more clearly shown in Fig. 11. For supporting the discharge chute 330 at its inner end a transversely extending angle bar 331 is welded to the under side of said chute adjacent said inner end, which angle bar 331 is fixedly secured by bolts 332 to the outer panel guide 203 exteriorly thereof and immediately below the discharge opening 251 therein. The outer end of the discharge chute 330 is adapted to be connected to and supported by a can take-away track, not shown.

The upper curved portion of the inner panel guide upon its interior face is provided with a transversely extending, outwardly projecting, can ejector plate 333 (Fig. 11) which plate is disposed in longitudinally aligned relation with the discharge end of the terminal runway section 125. The can ejector plate 333 is return-bent to provide an arcuate portion 334 thereon, which is substantially concentric with the shaft 113 and is normally disposed in an arcuate plane parallel to, but slightly inward of, the arcuate path of travel of the can propelling bars 122 as the associated endless sprocket chains 109 thereof pass over the sprocket wheels 112.

The generally horizontal upper and lower marginal portions of the can ejector plate 333 are welded at their transversely extending edges to the inner panel guide 202 with the generally horizontal upper marginal portion of said ejector plate 333 disposed in flush relation with the inwardly extending can supporting portion 204 of said inner guide panel 202.

With the arcuate portion 334 of the cam ejector plate 333 disposed in the manner above described, the cans K and the can propelling bars 122 are caused to jointly roll over said portion 334, thus changing the relationship between said cans K and said bars 122 and in consequence effecting expulsion of the cans K from the cooling apparatus into the discharge chute 330.

Can cooling medium supply system

The can cooling medium supply system I (Figs. 1, 2, 3, 6, 7, 9 and 11) comprises a transversely extending header or manifold 335 (Fig. 9) which header has an inlet 336 (Fig. 1) adapted to be connected with a source of cooling medium, in any suitable manner not shown. The header 335 is supported at a predetermined or selected elevation and at uniformly spaced intervals by a series of plate brackets 337, which are welded at their outer ends to the upper side of the header 335 and have their inner end portions rigidly secured by bolts 338 to a transversely extending angle bar 339, the ends of which are welded to the inner faces of the laterally aligned inner upright members 50 of the auxiliary end frame section 33.

The header 335 is provided upon the inner side thereof and at uniformly spaced intervals thereon with a series of inwardly extending outlet pipes 340, which pipes are individual to the rectangular cooling medium supply basins 152 welded upon the under sides of the runway sections 125.

Each outlet pipe 340 is exteriorly threaded at the outlet end thereof to receive the threaded inlet end of a control or regulating valve 341; the threaded outlet end of which is provided with a pipe nipple 342 having an upturned pipe elbow 343 threadedly connected to the outlet end thereof. Threadedly secured within the upturned outlet end of the pipe elbow 343 is a threaded fitting 344 to which is secured, by a band clamp 345, the lower end portion of an upwardly extending flexible hose 346, the upper end portion of which is secured, by a band clamp 347, to the inlet fitting 153 of the supply basin 152 with which the particular outlet pipe 340 is associated.

The transversely extending, rectangular catch basin 154 at its ends and adjacent its bottom wall is provided with outlet pipes 348 (Figs. 5 and 6) which pipes are exteriorly threaded at their outer ends to receive downturned pipe elbows 349. Threadedly connected to the down-turned outlet ends of the pipe elbows 349 and extending downwardly therefrom are cooling medium transfer pipes 350. Threadedly connected to the lower ends of the transfer pipes 350 are in-turned pipe elbows 352, which latter are interconnected at their inner ends by a transversely extending header or manifold 353 (Fig. 6).

The header 353 is provided upon the upper side thereof and at uniform intervals thereon with a series of upwardly extending outlet pipes 354, which are individually connected to the inlet fittings 163 of their respective rectangular cooling medium supply basins 162 welded upon the under sides of the can runway sections 130 of the lower runway tier. Accordingly, the upper end of each outlet pipe 354 is secured, as by a band clamp 355, to the lower end portion of an upwardly extending flexible hose 356 and the upper end of said hose is similarly secured by a band clamp 357 to the inlet fitting 163 of the supply basin 162 with which the particular outlet pipe 354 is associated, as and in the manner more clearly shown in Fig. 6.

The cooling medium upon completion of the circulation within the upper and lower series of can runways 123 and 124 is discharged or cascades from the outer lower ends of the can runway sections 128 into a transversely extending drain pan 358 (Figs. 1, 4 and 9) which pan is supported in any suitable manner within the lower portion of the auxiliary end frame section 33. The drain pan 358 is provided with an outwardly and downwardly inclined bottom wall 359 and with an outlet 360 located substantially midway the length of the outer end wall thereof (Fig. 4). If desired, the outlet 360 may be connected to a storage tank wherein the temperature of the cooling medium may be lowered to permit the re-use and recirculation of same within the can runways 123 and 124.

At the cooling medium transfer end of the cooling apparatus a drain pan 361 (Figs. 2, 3 and 6) is provided to entrap any spillage of the cooling medium as it is transferred from the cooling medium discharge ends of the upper series of can runways 123 to the cooling medium receiving ends of the lower series of can runways 124. The drain pan 361 is supported in any suitable manner, within the lower portions of the frame section 32 and the auxiliary end section 34. The drain pan 360 is provided with an outwardly and downwardly inclined bottom wall 362 and with an outlet 363 located substantially midway the length of the outer end wall thereof (Fig. 3). The outlet 363, if desired, may also be connected to the storage tank above mentioned, and thereby further conserve said cooling medium.

To entrap any lubricant which may drip from the runway rocking mechanisms F of the upper series of can runways 123 and prevent such lubricant from dropping upon the cans K traveling upwardly in the lower can runways 124, each of said runway rocking mechanism is provided with a transversely extending drip pan 364 (Figs. 1 and 2) which drip pan is supported in suspension from said rocking mechanism in any suitable manner.

If for any reason a can K becomes tilted while traveling upwardly in any of the can runways 123 or 124, safety devices 365 (Figs. 1 and 2) of any well known type are provided and are mounted adjacent the upper ends of said can runways to lie in the path of a tilted can. Such safety devices include usually switches (not shown) which when opened by a tilted can function to cut off power to the motors 61 and 87, and thus halt the operation of the cooling apparatus before any damage is done to the operating mechanisms of same by said tilted can.

Operation

In the operation of the present can cooling apparatus the motor 61 is started to activate the endless sprocket chains 109 and the can propelling bars 122 supported thereby. The motor 87 is next started to activate the runway rocking mechanisms F of the upper and lower can runways 123 and 124, to thus impart rocking movement to the individual can runway sections of same.

The control valves 341 are then opened to permit the cooling liquid to flow upwardly from the header 335 to the supply basins 152 of the can runways 123, from which basins the cooling liquid overflows through the slots 151 into and down the can runways 123 to cascade at the lower ends of same into the catch basin 154. From the catch basin 154 the cooling liquid flows downwardly from each end thereof, through the transfer piping associated therewith, to the header 353. From the header 353 the cooling liquid flows upwardly, through the piping associated therewith, to the supply basins 162, from which it overflows through the slots 161 into and down the can runways 124 to cascade from the lower ends of same into the drain pan 358. After initiating the flow of the cooling liquid within the can runways 123 and 124, the control valves 341 are then adjusted or regulated to maintain a desired minimum depth of cooling liquid within said can runways. In this manner the heat transfer between the contents of the cans and the cooling liquid may be varied in accordance with the heat retention properties of the particular commodity in the cans. For all practical purposes a depth of approximately three-eighths of an inch has been found satisfactory.

During an operational period of the present can cooling apparatus, a continuous supply of hot product-filled cans K are fed by the feed trough 329 to the can slow-down mechanism G, within which as hereinbefore described, said cans are individually and progressively slowed down before being dropped into the can receiving end of the initial can runway section 128.

As the cans K are individually discharged from the can slow-down mechanism G, each can first drops upon the can receiving plate 323 and then from the terminal tongue portion 324 of said plate it drops freely between the flared portions 128a of the rocking can runway section 128 into a pocket formed by consecutive propelling bars 122 moving along said runway section. Within said pocket the can remains during its entire traversal through the can cooling apparatus, and until it reaches the discharge opening of said apparatus, at which time and place it is ejected from said pocket.

It is, of course, to be understood that as the cans K are discharged from the can slow-down mechanism G, said cans will drop, as hereinbefore described, into the individual pockets successively formed by the moving can propelling bars 122 conjointly with the aforesaid can runway section 128 and its can guide rails 133, so that a continuous procession of such cans will be formed and will move continuously in single file through the cooling apparatus during an operational period of the same. However, for simplification of description of the can cooling operation, it is thought that a description of the traversal of a single can K through the can cooling apparatus should suffice for an understanding of the operation and effect of said cooling apparatus.

Upon dropping into the can receiving end of the initial can runway 124, the hot can K fresh from the processing unit simultaneously drops into the stream of cooling liquid descending through said initial can runway 124. The temperature of the cooling liquid at the place and time of entry of the can K thereinto is at its highest, since such cooling liquid normally increases in temperature in proportion to its descent, assuming, of course, for the moment that a series of hot cans K preceded the hot can K now being described. By thus first subjecting the hot can K to the cooling liquid at its highest temperature and during its ascent within the initial can runway section 124, from the lower to the upper end of same, subjecting said can to cooling liquid of progressively decreasing temperatures, a highly desirable, gradual and initial cooling of said hot can K is effected.

The hot can K is moved upwardly within the initial can runway 124 by the can propelling bar 122 in contact with the rear side of same, which propelling bar, during such upward movement, imparts a spinning motion in clockwise direction (as viewed in Fig. 9) to said hot can K and coincidentally therewith spinningly agitates the contents of said hot can into contact with the progressively cooled side walls thereof.

As the hot can K travels upwardly within the initial can runway 124, said can is simultaneously and continuously rocked upon an axis at right angles to its longitudinal axis by the rockable can runway sections 128, 129 and 130 of said initial can runway 124 rocking in unison to thereby agitate the can contents from end to end of the can and thus into contact with the progressively cooled end walls thereof, which are alternately immersed in the cooling liquid as said cooling liquid is rocked from side to side of the can runway sections aforesaid, by the rocking motion of the same.

Upon reaching the upper end of the initial can runway 124, or in other words the can return end of the can cooling apparatus, the can propelling bar 122 in contact with the rear side of the can K carries said can upwardly around the inner guide panel 164 into the can receiving end of the initial can runway 123. In said initial can runway 123, the can is carried upwardly by said propelling bar counter-current to the cooling liquid flowing downwardly therein, meanwhile having spinning motion imparted thereto in counterclockwise direction by said propelling bar (as viewed in Fig. 6) and being simultaneously rocked upon an axis transverse to its longitudinal axis by the rockable can runway sections 127, 126 and 125 rocking in unison. Thus, the can contents are again spinningly and rockably agitated into contact with the cooled side and end walls of the can, substantially as and in the manner hereinbefore described for the initial can runway 124.

When the somewhat cooler can K reaches the upper end of the initial can runway 123, or in other words, the can crossover or transfer end of the cooling apparatus, said can K enters the curved upper end portion of the first can guideway 218 and rolls over and down the curved upper end of the inner panel guide 202 into the diagonally disposed portion of said guideway 218, wherein it is carried downwardly by the can propelling bars 122 associated therewith. As the can K travels downwardly within the diagonally disposed portion of the first guideway 218, said can normally rests upon and is carried by the leading can propelling bar 122 associated therewith, substantially as and in the manner illustrated at the upper left-hand portion of Fig. 9. Upon arriving at the lower end of the diagonally disposed portion of the guideway 218 the can K passes into the curved lower end portion of said guideway, and coincidentally therewith drops onto and rolls downwardly upon and along the curved lower end portion of the outer panel guide 203 while spinning in a clockwise direction about its own axis substantially as and in the manner shown at the lower left-hand of Fig. 9. As the can K continues to roll downwardly upon the lower end of the outer panel guide 203 the trailing can propelling bar 122 associated therewith catches up with said can and again contacts its rear side to propel the same along the lower terminal, upwardly inclined portion of the guideway 218 into the can receiving end of the second can runway 124, within which runway the can K is carried upwardly by said trailing can propelling bar 122 counter-current to the cooling liquid flowing downwardly therein, to thereby effect further and progressive cooling of said can by spinning and rocking the same in said second can runway, as and in the identical manner hereinbefore described for the initial can runways 124 and 123.

In the foregoing description the traversal of the can K through one tier of can runways 124 and 123 and the manner of spinning and rocking said can during such traversal has been fully described. This description applies equally to the other five tiers of can runways 124 and 123. Finally when the cooled can K reaches the can discharge end of the can runway 123 of the last tier of can runways, the trailing can propelling bar 122 associated therewith transfers said can from said can runway 123 to the can supporting portion 204 (Fig. 11) of the inner panel guide 202 and from thence to the can ejector plate 333, whereon said can and said bar conjointly roll over and down the arcuate portion 334 of said ejector plate, which is effective to change the relative position of can and bar with the result that the can is ejected from engagement with the bar and is discharged into the quarter-turn discharge chute 330, as will be readily understood by referring to Fig. 11.

A slightly modified type of discharge chute is shown in Figs. 18 and 19. It comprises a longitudinally disposed, elongated, chute body 366 having a bottom wall 367 and side walls 368. The bottom wall 367 is provided lengthwise thereof with a rectangular can drop-out opening 369 and at its inner end with an upwardly and inwardly inclined extension 370. The side walls 368 at their inner ends are provided with slightly flared portions 371 having arcuate terminal edges 372.

The chute body 366 is adapted to be operatively positioned upon the outer panel guide 203 in longitudinally aligned relation with the can discharge opening 251 thereof, and with the extension 370 of the bottom wall 367 extending through said opening 251 to a point adjacent the path of travel of the downwardly traveling can propelling bars 122, so that said extension 370 functions as a fixed stripper member to strip the cans K from the bars 122 should any of said cans become stuck for any reason between consecutive can propelling bars 122. When the chute body 366 is operatively positioned upon the outer panel guide 203 in the manner just described the arcuate terminal edges 372 of the flared portions 371 of the side walls abut and rest upon the curved upper portion of said panel guide 203, as and in the manner shown in Fig. 18.

To support the chute body 366 in its operative position upon the outer panel guide 203, said chute body is provided upon its under side with transversely disposed, dependent, perforated lugs 373, which are welded to the chute body 366 at the juncture of the bottom wall 367 and the extension 370 of the same. The lugs 373 are rigidly secured by bolts 374 to the outer panel guide 203 immediately below the discharge opening 251 thereof.

The chute body 366 at its outer end is adapted to be connected to and supported by a can take-away track 375, and for such purpose the side walls 368 of said chute body 366 at their outer ends and on their outer faces are provided with relatively short angle bar uprights 376, which are welded to said outer faces and are adapted to normally abut and be rigidly secured by bolts 377 to similar uprights 378 carried by the inner end of the can take-away track 375.

Welded to the outer faces of the side walls 368 of the chute body 366 adjacent the inner end of the can drop-out opening 369 thereof and extending downwardly from said side walls 368 in transversely aligned relation are perforated lugs 379. Journaled adjacent its ends for rocking movement within the perforations of the lugs 379 is a transversely extending shaft 380, which shaft is retained against axial displacement within said perforated lugs 379, as by set collars 381 mounted upon the terminal portions thereof and which are fixedly secured thereto by pins 382 (Fig. 19).

A can drop-out or emergency door 383 is provided to normally close the can drop-out opening 369 of the chute body 366, and when in a closed position is disposed in flush relation with the bottom wall 367 of said chute body. The drop-out door 383 at the inner end thereof is adapted to be mounted upon the shaft 380 to rock therewith. For this purpose the door at its inner end and upon its under side is provided with a downwardly extending flange 384 having inwardly extending perforated ears 385 upon the outer face and adjacent the ends thereof. Said perforated ears embrace and are secured to the shaft 380 by set screws 386.

Welded to the inner face of the flange 384 and extending downwardly therefrom is the vertical leg 387 of a transversely extending member 388 of obtuse angular profile, the obtuse leg 389 of which is directed inwardly, as and in the manner shown in Fig. 18. Jointly welded to the under side of the can drop-out door 383 and the vertical leg 387 of the member 388 are longitudinally disposed, reinforcing or stiffening ribs 390.

Fixedly secured to the lower outer face of the obtuse leg 389 of the member 388 is the transversely extending leg 392 of a U-shaped lever 393, the side legs 394 of which are inclined upwardly and inwardly, as shown in Fig. 18. Adjustably mounted upon the side legs 394 are counterweights 395 for counterbalancing the weight of the can drop-out door 383 plus the weight of two of the product-filled cans K. The counterweights 395 are adjustably secured upon the inclined legs 394 as by clamping set screws 396.

In the operatin of the modified type of discharge chute, when, for any reason, the can take-away track 375 becomes clogged with the discharged product-filled cans K and in consequence some of the latter become stalled upon the can drop-out or emergency door 383, then and in that event said door will drop to its open position, indicated in dotted lines in Fig. 18, as soon as more than two of the cans K become stalled thereon, to thus effect discharge of such stalled cans into an appropriately located receptacle, not shown. Coincidentally with the dropping of the door 383 to its open position, a mercury switch, not shown, is adapted to be activated by either the shaft 380 or said door 383 to thereby cut-off the power to the motors 61 and 87 and thus halt the operation of the cooling apparatus. When the clogged condition in the can take-away track 375 has been remedied and the can drop-out or emergency door 383 has been automatically returned to its closed position by the counterweights 395, the aforementioned mercury switch is automatically closed and the normal operation of the cooling apparatus is resumed.

While we have illustrated and described a preferred embodiment of the present invention, it will be understood, however, that various changes and modifications may be made in the details thereof without departing from the spirit and scope of the invention as set forth in the appended claims.

Having thus described the invention, what we claim as new and desire to protect by Letters Patent is as follows:

1. Apparatus for treating canned goods comprising an inclined runway mounted on a fixed longitudinal axis for transverse rocking movement, means for rocking said runway on said axis, means for moving cans along said runway, and means for supplying treating liquid to said runway for gravitation down the same.

2. Apparatus for treating canned goods comprising an inclined runway mounted on a fixed longitudinal axis for tranverse rocking movement, means for transversely rocking said runway on said axis, a conveyor associated with said runway for moving cans upwardly thereon, and means for supplying treating liquid to said runway for gravitation down the same against the ascending cans.

3. A can treating apparatus comprising an inclined can treating runway mounted on a fixed longitudinal axis for transverse rocking movement, means for transversely rocking said runway on said axis, a conveyor associated with said inclined treating runway and having flights disposed transversely thereof and spaced from each other to provide pockets therebetween for receiving cylindrical cans with their axis parallel to said flights, means for moving said conveyor for advancing the cans from the lower to the upper end of said inclined treating runway, and means for supplying a treating liquid to the upper end of said runway for gravitation therealong.

4. A treating apparatus for cylindrical cans comprising an inclined can treating runway adapted to receive a procession of cans to be treated with their axes arranged transversely to said runway, means mounting said inclined can treating runway on a fixed longitudinal axis for transverse rocking movement, means for transversely rocking said runway on said axis, means for introducing and causing a shallow stream of treating liquid to flow downwardly through said runway, means for regulating the depth of said stream of treating liquid, and conveyor means for moving the cans upwardly along said runway while partially submerged in said stream of treating liquid.

5. Apparatus for treating canned goods comprising a sectional inclined can treating runway, means mounting the sections of said inclined runway for individual transverse rocking movement, means for individually rocking said runway sections, means for flexibly interconnecting the opposing ends of said sections in watertight relation, means for moving cans upwardly along said sectional inclined runway, and means for supplying treating liquid to said sectional inclined runway for gravitation down the same against the ascending cans.

6. Apparatus for treating canned goods comprising an inclined can treating runway having oppositely inclined sections interconnected to form a continuous can path, means mounting said oppositely inclined sections for individual transverse rocking movement, means for individually rocking said inclined sections, means for moving cans upwardly along said inclined can treating runway, and means for individually supplying treating liquid to said oppositely inclined sections for gravitation down same against the cans ascending therein.

7. Apparatus for treating canned goods comprising an inclined can treating runway having an inclined lower section and an oppositely inclined upper section, means for connecting the upper end of the lower section with the lower end of said upper section to provide a continuous can path from the lower to the upper end of said can treating runway, means mounting said oppositely inclined sections for individual transverse rocking movement, means for individually rocking said oppositely inclined sections; a conveyor associated with said inclined can treating runway for moving cans upwardly therealong, means for supplying treating liquid to said oppositely inclined upper section adjacent the upper end thereof for gravitation down same against the ascending cans, and means for transferring treating liquid from the lower end of said upper section to said lower inclined section adjacent the upper end thereof for gravitation down the same against the ascending cans.

8. Apparatus for treating canned goods comprising an inclined can treating runway having an inclined lower section and an oppositely inclined upper section superimposed thereabove, means for connecting the upper end of the lower section with the lower end of said upper section to provide a continuous can path from the lower to the upper end of said can treating runway, means mounting said oppositely inclined sections for individual transverse rocking movement, means for individually rocking said oppositely inclined sections, means for individually supplying treating liquid to said oppositely inclined lower and upper sections adjacent the upper ends thereof to provide shallow streams of treating liquid thereon, an endless conveyor movable along said can treating runway in spaced relation thereabove and having pockets for receiving individual cylindrical cans for support by said runway with their axes disposed transversely thereof, and means for moving said conveyor to advance the cans from the lower to the upper end of said can treating runway in partially submerged condition countercurrent to said streams of treating liquid within said oppositely inclined lower and upper sections.

9. Apparatus for treating canned goods comprising an inclined can treating runway of helical formation, said runway having at least two inclined rectilinear lower sections and at least two oppositely inclined rectilinear upper sections substantially superimposed thereabove, means for connecting the upper ends of the lower sections to the lower ends of their respective superimposed upper sections at a common end of the apparatus, and means at the opposite end of the apparatus for connecting the upper can discharge end of one of said upper sections to the lower can receiving end of one of said lower sections so as to constitute a continuous can path, means mounting said inclined lower and upper rectilinear sections for transverse rocking movement, means for rocking said sections, means for moving cans from the lower to the upper end of said can treating runway, and means for supplying treating liquid to said oppositely inclined lower and upper rectilinear sections for gravitation down said runway against the cans ascending therein.

10. Apparatus for treating canned goods comprising an inclined can treating runway of a helical formation, said runway having at least two inclined rectilinear lower sections and at least two oppositely inclined rectilinear upper sections superimposed thereabove, means for flexibly connecting the upper ends of the lower sections to the lower ends of their respective superimposed upper sections at a common end of the apparatus and a crossover track at the opposite end of the apparatus for connecting the upper discharge end of one of said upper sections with the lower feed end of one of said lower sections so as to constitute a continuous can path, means individually mounting said oppositely inclined lower and upper rectilinear sections for transverse rocking movement, means for individually rocking said oppositely inclined sections, means for individually supplying treating liquid to said oppostely inclined sections adjacent the upper ends thereof to provide shallow streams of treating liquid thereon, an endless conveyor movable along said inclined can treating runway in spaced relation thereabove and having pockets for receiving individual cylindrical cans for support by said runway with their axes disposed transversely thereof, and means for moving said conveyor for advancing the cans from the lower to the upper end of said can treating runway in partially submerged condition counter-current to said streams of treating liquid within said oppositely inclined lower and upper rectilinear rocking sections.

11. In an apparatus for treating canned goods, in combination, a can runway mounted on a fixed longitudinal axis for transverse rocking movement, and power means operatively connected to said runway for imparting transverse rocking movement thereto on said axis.

12. In an apparatus for treating canned goods, in combination, an inclined can runway mounted on a fixed longitudinal axis for transverse rocking movement, replaceable wear strips substantially coextensive with said can runway and adapted to be detachably secured to the upper face of the bottom wall thereof, and power means operatively connected to said runway for imparting transverse rocking movement thereto on said axis.

13. In an apparatus for treating canned goods, in combination, an inclined can runway having upwardly extending side walls formed into can guide rails, means mounting said can runway on a fixed longitudinal axis for transverse rocking movement, and power means operatively connected to said runway for imparting transverse rocking movement thereto on said axis.

14. In an apparatus for treating canned goods, in combination, an inclined trough-shaped can runway, means supporting said can runway on a fixed longitudinal axis for transverse rocking movement, said supporting means including an arm secured to and depending from the lower face of said can runway, and actuating means for imparting transverse rocking movement to said can runway on said axis, including a rotatably mounted shaft, an eccentric keyed to said shaft, and a rod having one end thereof operatively mounted upon said eccentric and the other end of same operatively connected to said arm.

References Cited in the file of this patent

UNITED STATES PATENTS

| | | |
|---|---|---|
| 1,215,212 | Souder | Feb. 6, 1917 |
| 1,570,235 | Fooks | Jan. 19, 1926 |
| 1,880,232 | Birdseye | Oct. 4, 1932 |
| 1,891,425 | Kronquest | Dec. 20, 1932 |
| 2,148,276 | Powers | Feb. 21, 1939 |
| 2,276,471 | Eberhart | Mar. 17, 1942 |
| 2,477,992 | Leonard | Aug. 2, 1949 |
| 2,542,451 | Anderson et al. | Feb. 20, 1951 |
| 2,597,223 | Burgess | May 20, 1952 |